US011126483B1

(12) United States Patent
Das et al.

(10) Patent No.: US 11,126,483 B1
(45) Date of Patent: Sep. 21, 2021

(54) DIRECT MESSAGE RETRIEVAL IN DISTRIBUTED MESSAGING SYSTEMS

(71) Applicant: Oracle International Corporation, Redwood Shores, CA (US)

(72) Inventors: Mihir Kumar Das, Pleasanton, CA (US); Yuvaraj Chandrasekaran, Newark, CA (US); Santosh Kumar Kotikalapudi, Pleasanton, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 16/851,605

(22) Filed: Apr. 17, 2020

(51) Int. Cl.
*G06F 3/00* (2006.01)
*G06F 9/54* (2006.01)
*H04L 12/58* (2006.01)

(52) U.S. Cl.
CPC .............. *G06F 9/546* (2013.01); *H04L 51/16* (2013.01); *H04L 51/24* (2013.01); *H04L 51/28* (2013.01); *H04L 51/34* (2013.01)

(58) Field of Classification Search
CPC ........................................................ G06F 9/546
USPC ......................................... 710/313; 719/313
See application file for complete search history.

(56) References Cited

U.S. PATENT DOCUMENTS

| | | | |
|---|---|---|---|
| 5,574,860 A * | 11/1996 | Perlman | H04L 45/02 340/5.74 |
| 6,301,253 B1 * | 10/2001 | Ichikawa | H04L 47/10 370/230 |
| 7,269,603 B1 * | 9/2007 | Dewan | G06F 9/465 |
| 7,647,401 B1 * | 1/2010 | Collet | H04L 67/24 709/224 |
| 8,095,598 B2 | 1/2012 | Follmeg et al. | |
| 8,275,841 B2 | 9/2012 | Heinla et al. | |
| 8,627,333 B2 | 1/2014 | Chen et al. | |
| 9,436,532 B1 | 9/2016 | Chandrasekaran et al. | |
| 10,091,215 B1 * | 10/2018 | Word | H04L 63/1408 |
| 10,140,153 B2 | 11/2018 | Wang | |
| 2003/0182464 A1 | 9/2003 | Hamilton et al. | |

(Continued)

OTHER PUBLICATIONS

Wensong Zhang, Linux Virtual Server Clusters. (Year: 2003).*

(Continued)

*Primary Examiner* — Lechi Truong
(74) *Attorney, Agent, or Firm* — Kilpatrick Townsend & Stockton LLP

(57) ABSTRACT

A messaging service may be distributed in a cluster of nodes such that each node includes an instance of the messaging service. To ensure that messages are not lost in the messaging service through a load balancer, addresses for each of the nodes may be accessed, and messages may be retrieved from individual instances of the messaging service by addressing the nodes directly and bypassing the load balancer. To retrieve messages, a client may cycle through the node addresses and retrieve messages until each corresponding message queue is empty. Once a message queue is empty, the client may stop sending requests to the corresponding node until the message queues on the other nodes have been emptied. Various request patterns may be used to cycle through node addresses, including Round Robin patterns and patterns that correspond to traffic patterns seen by the load balancer.

18 Claims, 17 Drawing Sheets

(56) References Cited

U.S. PATENT DOCUMENTS

| | | | |
|---|---|---|---|
| 2004/0260745 A1* | 12/2004 | Gage | H04L 29/12018 709/200 |
| 2005/0091504 A1* | 4/2005 | Shirogane | H04L 67/1097 713/182 |
| 2005/0249060 A1* | 11/2005 | Arashi | G11B 7/005 369/44.27 |
| 2006/0041614 A1* | 2/2006 | Oe | G06F 12/0868 709/203 |
| 2012/0077600 A1* | 3/2012 | Lagercrantz | H04L 67/38 463/42 |
| 2012/0144138 A1* | 6/2012 | Kandasamy | G06F 9/524 711/163 |
| 2013/0060834 A1 | 3/2013 | Paramasivam et al. | |
| 2013/0212264 A1* | 8/2013 | Troppens | G06F 11/2005 709/224 |
| 2014/0372516 A1 | 12/2014 | Watte et al. | |
| 2016/0066035 A1* | 3/2016 | Chesluk | H04N 21/4756 725/109 |

OTHER PUBLICATIONS

Kreps et al., "Kafka: A Distributed Messaging System for Log Processing", Available Online at: http://notes.stephenholiday.com/Kafka.pdf, Jun. 12, 2011, 7 pages.

Patel et al., "Towards In-Order and Exactly-Once Delivery using Hierarchical Distributed Message Queues", Available Online at: http://datasys.cs.iit.edu/publications/2014_SCRAMBL14_HDMQ.pdf, May 2014, 10 pages.

\* cited by examiner

DIRECT MESSAGE RETRIEVAL IN DISTRIBUTED MESSAGING SYSTEMS

BACKGROUND

Distributed messaging systems are used to broker messages between receiving and sending clients. Instead of sending a message directly to another client, a sending client may send a message to the messaging system. The messaging system may then store the messages in central queues until they are retrieved by the receiving system. When the messaging system is distributed, instances of the messaging system may be deployed to various containers or nodes. Load balancers may then be used to distribute messages that are received to populate different message queues within the distributed messaging system. Similarly, requests to retrieve messages may be funneled through the load balancer to balance request traffic between each of the different messaging queues.

After messages are received, some distributed messaging systems may send a notification to the receiving client device indicating that messages are available. However, these "push" based protocols generate additional notification traffic every time messages are received, which reduces the bandwidth available in the system. In contrast, other messaging systems use a "pull" based protocol where messages are stored in message queues until they are retrieved by the receiving client systems. This allows the receiving client systems to retrieve messages at their convenience. Pull-based protocols also route request traffic through the load balancer.

BRIEF SUMMARY

A messaging service may be distributed in a cluster of nodes such that each node includes an instance of the messaging service. To ensure that messages are not lost in the messaging service through a load balancer, addresses for each of the nodes may be accessed, and messages may be retrieved from individual instances of the messaging service by addressing the nodes directly and bypassing the load balancer. To retrieve messages, a client may cycle through the node addresses and retrieve messages until each corresponding message queue is empty. Once a message queue is empty, the client may stop sending requests to the corresponding node until the message queues on the other nodes have been emptied. Various request patterns may be used to cycle through node addresses, including Round Robin patterns and patterns that correspond to traffic patterns seen by the load balancer.

The cluster may include a plurality of nodes, and a subset of those nodes may include instances of the messaging service. When messages are received by the cluster, the load balancer determines a node that should receive the message, and the instance of the messaging service on that node may store the message in a message queue. Based on the distribution pattern used by the load balancer, some instances of the messaging service may receive more messages than others. When a request to retrieve a message is received by the load balancer, the load balancer then selects one of the plurality of nodes and retrieves a single message from the queue (e.g. "popping" a message off the top of the queue) and returns the message to the requesting client. However, when requests to retrieve messages go through the load balancer, it is possible that messages in some nodes are rarely retrieved based on the distribution pattern of the load balancer. For example, nodes that include other services may have high traffic patterns that prevent the load balancer from requesting messages from those nodes. After receiving a response from one of the nodes that no additional messages are available, the client device would not be aware that other messages are still available on nodes that have not been selected by the load balancer.

Instead of routing requests through the load balancer, a client may request and retrieve a list of node addresses from the cluster. This request may be made at the domain level or using a Java Naming and Directory Interface® (JNDI). The client may store a data structure, such as a table, that holds a list of the node addresses for each node containing an instance of the messaging service on the cluster. The table may also store a status of each node address indicating whether the corresponding message queue has been emptied.

To retrieve messages, the client may cycle through the node addresses and address each of the nodes individually, bypassing the load balancer entirely. For example, the client may request a single message from a first node, then request a single message from a second node, then request a single message from a third node, then cycle back to the first node to request an additional message in a Round-Robin fashion. When a "null" response is received from one of the nodes indicating that the corresponding message queue is empty, that address may be removed from the cycling operation. For example, a status in the data structure storing the node addresses may be changed to indicate that the queue is empty. This prevents the client from repeatedly requesting messages from an empty queue and allows the client to focus on nodes that still contain messages. The cycling process may continue until each of the nodes returns a null response.

BRIEF DESCRIPTION OF THE DRAWINGS

A further understanding of the nature and advantages of various embodiments may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION

A messaging service may be distributed in a cluster of nodes such that each node includes an instance of the messaging service. To ensure that messages are not lost in the messaging service through a load balancer, addresses for each of the nodes may be accessed, and messages may be retrieved from individual instances of the messaging service by addressing the nodes directly and bypassing the load balancer. To retrieve messages, a client may cycle through the node addresses and retrieve messages until each corresponding message queue is empty. Once a message queue is empty, the client may stop sending requests to the corresponding node until the message queues on the other nodes have been emptied. Various request patterns may be used to cycle through node addresses, including round-robin patterns and patterns that correspond to traffic patterns seen by the load balancer.

Figure 1:
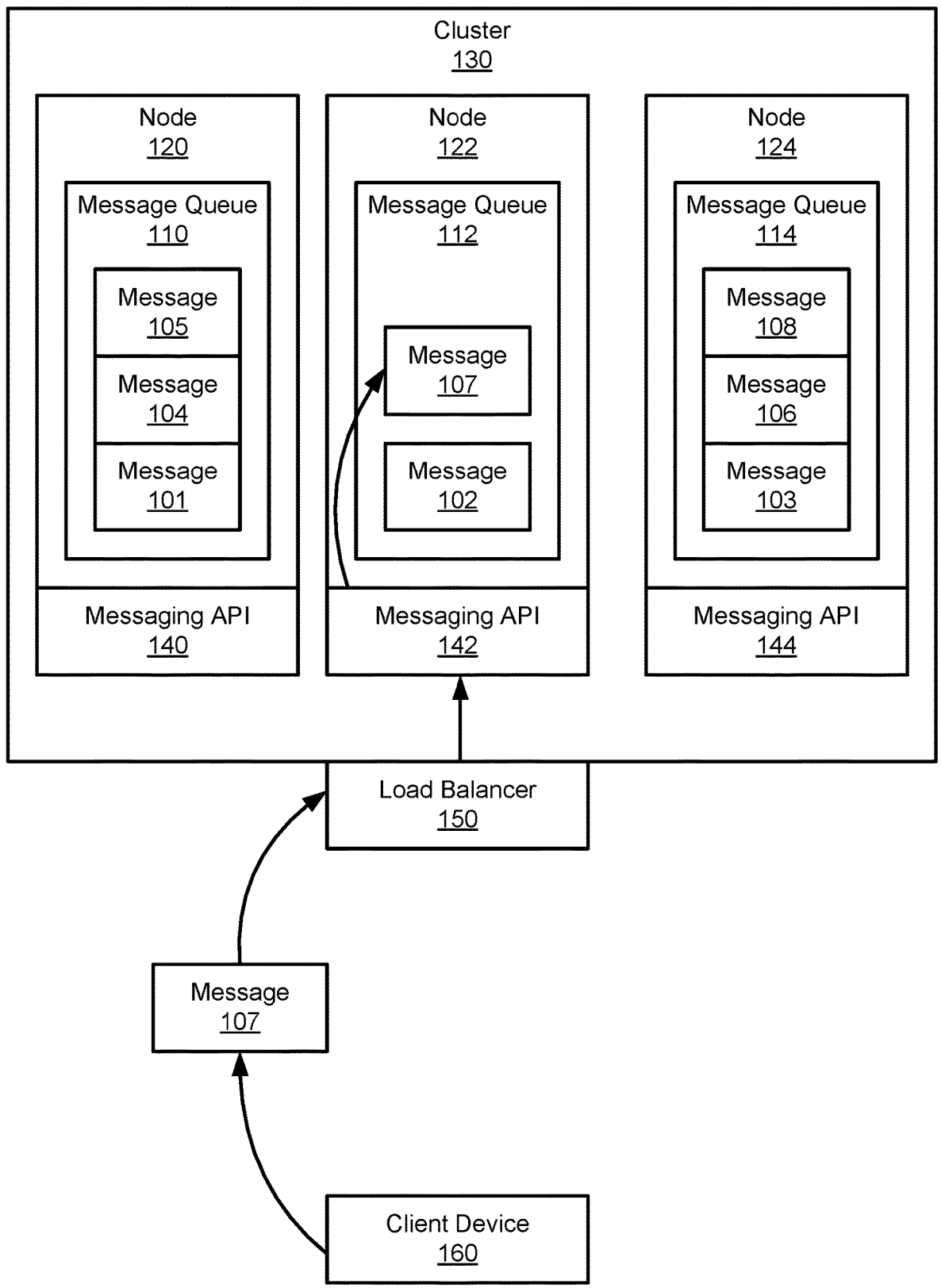
FIG. 1 illustrates a distributed messaging service, according to some embodiments.

FIG. 1 illustrates a distributed messaging service, according to some embodiments. The distributed messaging system may include a cluster 130, and the cluster 130 may include a plurality of nodes 120, 122, 124. The cluster 130 may be part of a containerized environment, such as an orchestration environment, and the nodes 120, 122, 124 may represent one or more containerized services. For example, a service may be instantiated in a Docker® container and deployed to the cluster 130.

The messaging service may be deployed as a distributed messaging service. An instance of the messaging service may be deployed to each of a plurality of nodes 120, 122, 124 such that multiple instances of the messaging service operate together simultaneously in the cluster 130. Each instance of the messaging service may operate independently with respect to other instances of the messaging service. For example, an instance of the messaging service in node 120 may send and receive messages without receiving any information from an instance of the messaging service operating in node 122. An unlimited number of instances of the messaging service may be deployed to nodes in the cluster 130, and the number of instances deployed to nodes in the cluster 130 may vary dynamically during operation. For example, as messaging traffic is increased, additional instances of the messaging service may be deployed to nodes and instantiated in the cluster 130. Conversely, as messaging queues in the messaging services begin to empty and traffic subsides, instances of the messaging service may be removed from the cluster 130.

Each instance of the messaging service may include a message queue 110, 112, 114. The message queues 110, 112, 114 may be used to store messages that are received from client devices. For example, as an instance of the messaging service in node 122 receives a message, it may be inserted at the front/back of the message queue 112 for node 122. The message queues 110, 112, 114 may be implemented using any type of data structure, including a queue, a stack, an array, a vector, a database, a table, and/or any other storage method. In some implementations, each node may include a message queue that is specifically assigned to a particular client device. For example, the message queues 110, 112, 114 illustrated in FIG. 1 may be assumed for purposes of this explanation to all be assigned to a single receiving client device. It will be understood that additional message queues that are not specifically illustrated in FIG. 1 may also be present on each of the nodes 120, 122, 124 and may be assigned to other client devices.

Instances of the messaging service may also include messaging Application Programming Interfaces (APIs) 140, 142, 144. The messaging APIs 140, 142, 144 may act as a public interface to the messaging service to send and/or receive messages from client devices. For example, the messaging APIs 140, 142, 144 may include an API function that allows a client device to send a message to the messaging service. The messaging APIs 140, 142, 144 may also include an API function that allows a client to retrieve a message from the messaging service.

The cluster 130 may also include a load balancer 150. Typically, the interfaces for the messaging APIs 140, 142, 144 are not publicly available. Instead, messages that are received by the cluster 132 for the distributed messaging service are received by the load balancer 150. For example, when sending a message to the messaging service, a client device will typically address the load balancer 150 as the public interface for the cluster 130 rather than any of the individual messaging APIs 140, 142, 144. The load balancer 150 analyzes the load on each of the nodes 120, 122, 124 and determines which one of the plurality of nodes 120, 122, 124 should receive the message being sent. The load balancer 150 may operate such that the load between the nodes 120, 122, 124 is relatively balanced.

FIG. 1 illustrates an example of how a client device 160 may submit a message 107 to the messaging service. The client device 160 may package the message 107 into a transmission that is addressed to or intercepted by the load balancer 150. The load balancer 150 may accept the transmission, which may be formatted such that it conforms with a function provided by the messaging APIs 140, 142, 144. The load balancer 150 may then determine that the messaging traffic to node 122 is the smallest compared to the other nodes 120, 124 in the cluster 130. The load balancer 150 may then send the transmission to the messaging API 142 of the instance of the messaging service operating in node 120. For example, the load balancer 150 may forward the transmission as it has been received from the client device 160, except that the address may be changed to that of the function of the messaging API 142. For example, the messaging API 142 may include a REST interface that allows the client device 162 submit a POST command with a message payload to the messaging API 142. The messaging API 142 may then submit the message 107 to the message queue 112 stored in node 122. For example, message 107 may be placed at the back of the message queue 112 behind an existing message 102 that was previously received by the instance of the messaging service in node 122.

The cluster 130 in FIG. 1 is a simplified version of a distributed messaging system. Although only three nodes 120, 122, 124 are illustrated, it will be understood that many additional nodes containing instances of the messaging system may be provided in the cluster 130. Additionally, the cluster 130 may include nodes that do not contain instances of the messaging system, but which instead contain instances of other services. Therefore, the load balancer 150 may route traffic to various nodes for the distributed messaging system as well as other services provided by the cluster 130.

Figure 2:
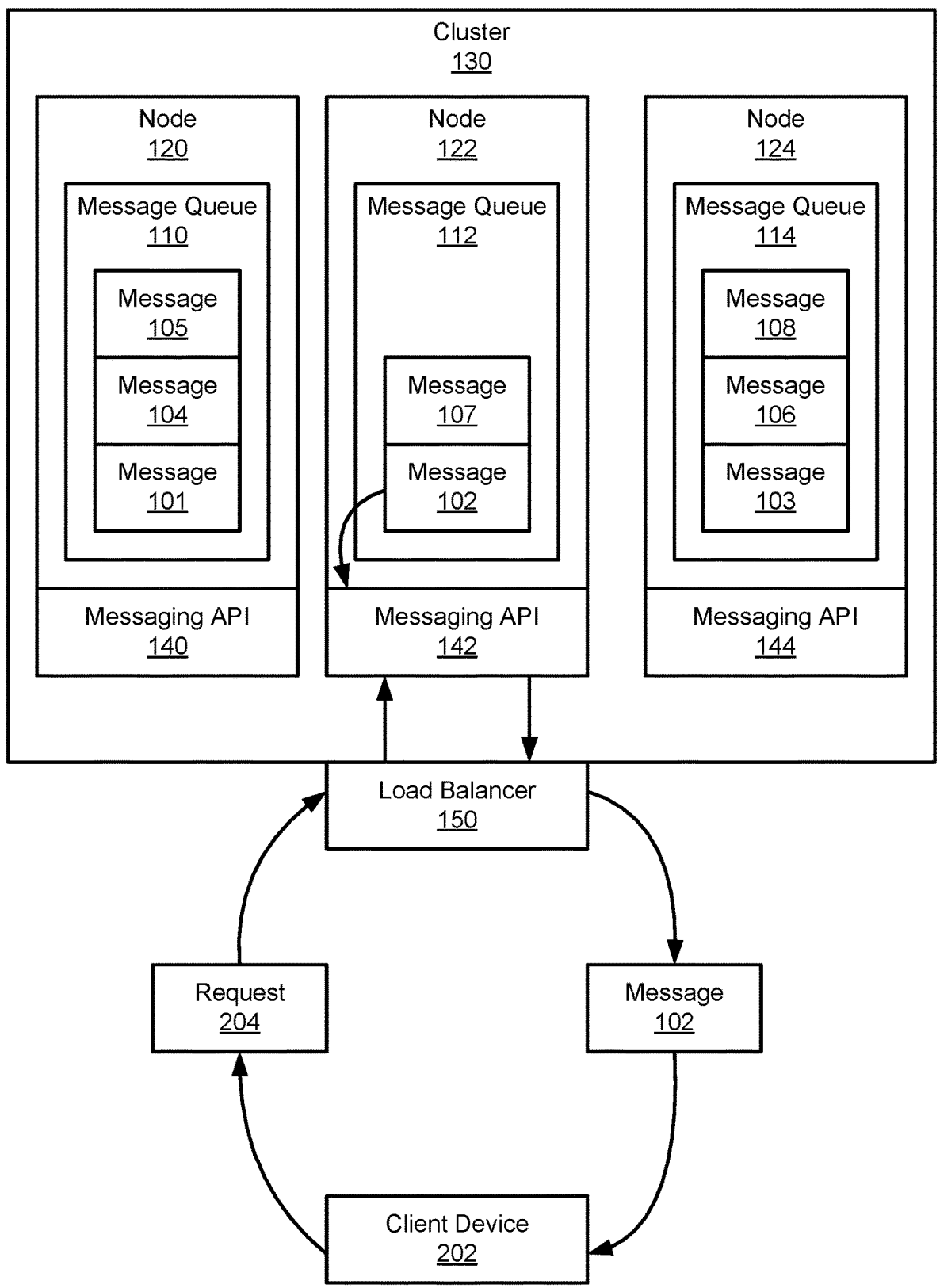
FIG. 2 illustrates how messages may be retrieved from a distributed messaging service, according to some embodiments.

FIG. 2 illustrates how messages may be retrieved from a distributed messaging service, according to some embodiments. In some implementations, the messaging service may be implemented as a "push" messaging service, where the messaging service provides an indication that a message has arrived for a receiving client device. For example, when the message 107 was received above in the example of FIG. 1, the messaging API 142 may send a push notification to a receiving client device 202. This notification may provide the message 107 in its entirety to the client device 202 such that the message is downloaded to a messaging client on the client device 202.

In other implementations, the message service may be implemented as a "pull" messaging service, where the messaging service relies on the client device 202 to retrieve messages from the messaging service. Instead of pushing received messages to the client device 202, the messaging service may instead store the messages that are received from sending client devices until the receiving client device 202 specifically requests that those messages be retrieved. Between times when the receiving client device 202 requests messages from the messaging service, the messaging queues 110, 112, 114 may progressively fill with messages until they are retrieved. For the embodiments described below, a pull messaging service may be assumed where clients actively retrieve messages from the messaging service.

To determine whether any messages are waiting in the distributed messaging service, the client device 202 may submit a request 204 to the cluster 130. The load balancer 150 may receive the request 204 and route the request to one of the messaging APIs 140, 142, 144 based on message traffic that is monitored by the load balancer 150 as described above. In this example, the load balancer 150 may select node 122 to receive the request 204. After forwarding the request 204 to messaging API 142, the node 122 may retrieve one of the available messages from its message queue 112. In this example, the message queue 112 may provide message 102, which has been in the message queue 112 the longest. Message 102 may then be delivered to the client device 202. In some embodiments, message 102 may be passed through an interface for the cluster 130, while in other embodiments, message 102 may be sent directly to the client device 202 from the node 122.

To retrieve the remaining messages from message queue 112, the client device 202 may simply submit a second request to the load balancer 150. Assuming that the load balancer 150 routes the request back to messaging API 142, the remaining message 107 in the message queue 112 may be delivered to the client device 202. After retrieving message 102 and message 107, the message queue 112 within be empty. If a subsequent request from the client device 202 was received by the messaging API 142, the messaging API 142 may provide an indication that the message queue 112 is empty. For example, the messaging API 142 may provide a "null" response when the message queue 112 is empty.

As described above, messages may be placed in the different message queues 110, 112, 114 based on the decisions made by the load balancer 150. Therefore, it is possible that the message queues 110, 112, 114 will not fill uniformly. Instead, some message queues may contain many messages for the client device 202, while other message queues contain relatively few messages for the client device 202. It is also possible that some of the message queues 110, 112, 114 include no messages for the client device 202. As illustrated in the example above, the client device 202 does not control which of the nodes 120, 122, 124 receive the request to retrieve messages. Instead, the client device to 202 simply provides the request to the load balancer 150, and the load balancer 150 selects the node with the lowest messaging traffic at that moment.

Because existing interfaces to distributed messaging systems are routed through a load balancer, a technical problem exists where it is possible that some messages may languish in messaging queues that are not selected by the load balancer 150. Continuing with the example above, after the messages 102, 107 have been retrieved from node 122, messages may still exist in node 120 and in node 124. However, if a subsequent request from the client device 202 is routed back to node 122, the messaging API 142 may generate a null response. Upon receiving a null response, there is no way for the client device 202 to know whether more messages exist in the system or not. At best, the client device 202 may determine that a single message queue in the cluster 130 is empty. Repeatedly sending requests to retrieve messages to the load balancer 150 may not resolve this problem, because those requests may be routed back to the same node 122 that provided the null response. In the meantime, messages may persist and continue to grow in other message queues in the system. In short, a distributed messaging system with a load balancer 150 relies on the luck of the load balancer 150 to retrieve all of the available messages for a particular client device 202.

The embodiments described herein solve these and other technical problems by bypassing the load balancer 150 when retrieving messages. Messages may still be submitted to the distributed messaging system through the load balancer 150 such that the various message queues 110, 112, 114 are filled evenly and/or with respect to message traffic. However, when retrieving messages from the distributed messaging system, the client device 202 may instead address the individual nodes 120, 122, 124 directly such that the load balancer 150 is bypassed. By cycling through each of the nodes that contain instances of the messaging service, the client device 202 may ensure that all messages are eventually extracted from the various message queues 110, 112, 114.

Figure 3:
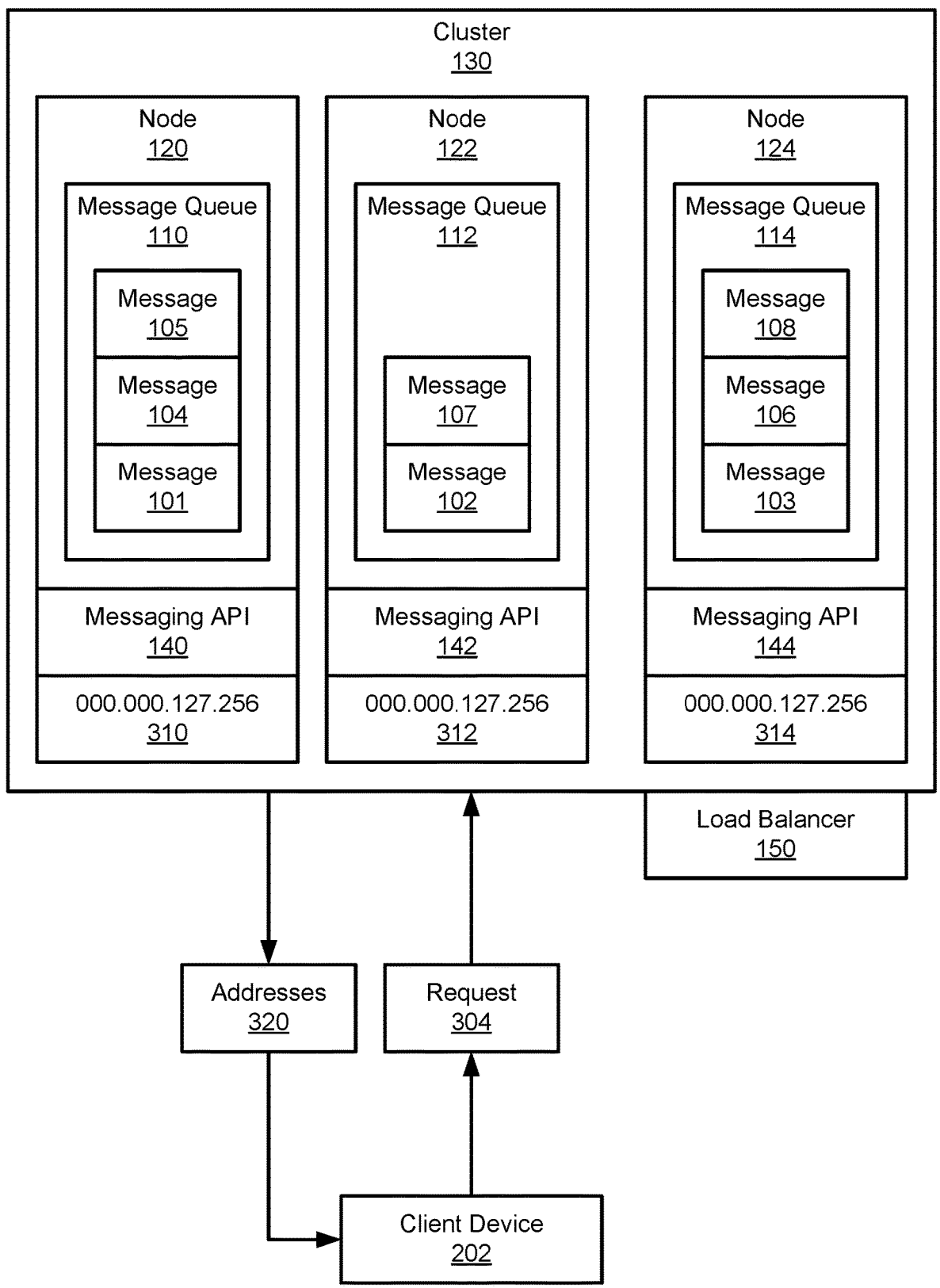
FIG. 3 illustrates how node addresses may be accessed for retrieving messages, according to some embodiments.

FIG. 3 illustrates how node addresses may be accessed for retrieving messages, according to some embodiments. The client device 202 may access a plurality of node addresses corresponding to nodes in the cluster on which instances of the messaging service are installed. The client device 202 may already have these addresses stored from a previous session or from some other source. For example, addresses for the nodes 120, 122, 124 may be provided to the client device 202 periodically as part of a subscription or in response to periodic requests. In the example of FIG. 3, the client device 202 may send a request 304 to the cluster 130 at the domain level. The cluster 130 may maintain a registry of all nodes and services that are currently instantiated/operating in the cluster. The cluster 130 may respond with a list of addresses 320 for each of the nodes 120, 122, 124 on which the messaging service is installed. In some cases, the cluster 130 may provide a full listing or directory of all nodes installed on the cluster 130. The client device 202 may parse/filter the full listing of node addresses and identify node addresses that include the distributed messaging service.

The cluster 130 may include an API or other interface that receives the request 304 from the client device 202. In some embodiments, the cluster 130 may use a JNDI, which comprises a Java API for a directory service that allows Java software clients to discover and look up data and resources in the cluster 130. Using this interface, the client device 202 may look up addresses for each of the nodes 120, 122, 124. The addresses may include service endpoints that may be accessed using Representational State Transfer (REST) interface calls. For example, the addresses may include an IP address through which REST calls (e.g., GET, POST, PUT, etc.) may be made.

In the example of FIG. 3, each of the nodes may be associated with an individual node address 310, 312, 314. These node addresses 310, 312, 314 may be separate and distinct from an address that is used to send requests to the load balancer 150. In response to the request 304, the cluster 130 may provide the addresses 320 in a transmission to the client device 202. The address is 320 may then be stored by the client device 202 for a current message retrieval session and/or for future message retrieval sessions. In cases where nodes are dynamically created/removed from the cluster 130, the addresses 320 may be requested with each message retrieval session. In cases where nodes are more static and/or in cases where message retrieval sessions occur relatively close together in time, the addresses 320 may be reused between multiple message retrieval sessions. For example, when a first message retrieval session is followed by a second message retrieval session within a predefined time limit (e.g., 30 seconds, 60 seconds, 90 seconds, etc.), then the addresses 320 retrieved for the first message retrieval session may be reused for the second message retrieval session.

Figure 4:
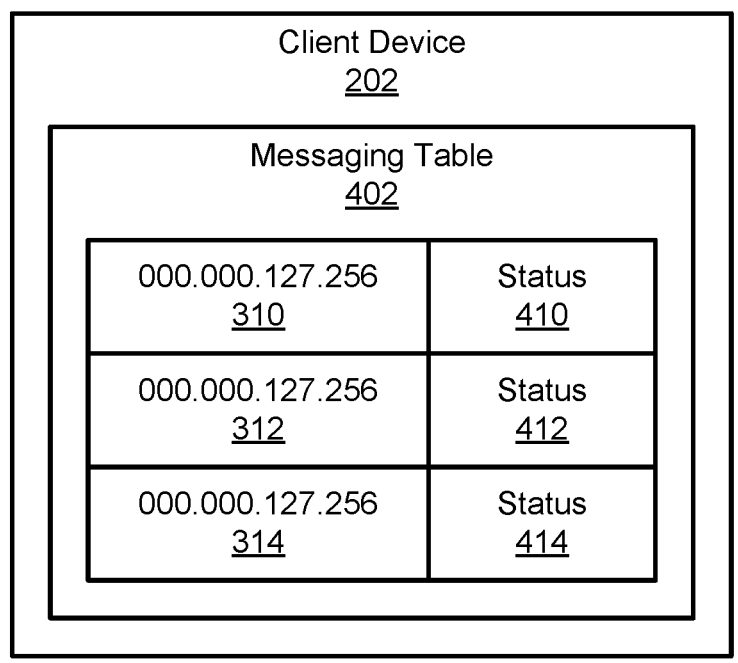
FIG. 4 illustrates a data structure for storing node addresses, according to some embodiments.

FIG. 4 illustrates a data structure for storing node addresses, according to some embodiments. When requesting messages from the cluster 130, the client device 202 may access a plurality of node addresses. As described above, this access may include requesting/receiving node addresses from the cluster 130 itself. Alternatively or additionally, this may include accessing a data structure stored at the client device 202, or elsewhere, that lists the addresses for the nodes in the cluster 130. The data structure may be populated at run time when the request is made. For example, the data structure may be populated in response to receiving a list of addresses from the cluster 130. The data structure may also be loaded or retrieved in response to initiating a request to receive messages from the distributed messaging service.

In this example, the data structure may include a messaging table 402. The messaging table made include a column of node addresses 310, 312, 314 for nodes on which instances of the distributed messaging service are located. In in some embodiments, the messaging table 402 may include other node addresses that are also associated with the cluster, but that do not necessarily include the distributed messaging service. The messaging table 402 may also include a column of statuses 410, 412, 414 that indicate a status of the message queue within each of the addressed nodes. For example, a status may indicate that messages may still be available in a particular node. Another status may indicate that a most recent message retrieval request to that node returned a null or empty response indicating that no messages remained in the queue.

Although the data structure in FIG. 4 is illustrated as a messaging table 402, this table is provided only by way of example and is not meant to be limiting. Any other data structure may be used to store addresses and/or statuses of nodes holding instances of the distributed messaging service. For example, the data structure may include a table, an array, a vector, a linked list, a database, a spreadsheet, an XML document, a JSON packet, and/or any other structure for organizing data. In some embodiments, the data structure may be stored remotely such that it is available through a web service, a micro service, a cloud service, and/or any other interface that may be accessed remotely through a network.

Figure 5A:
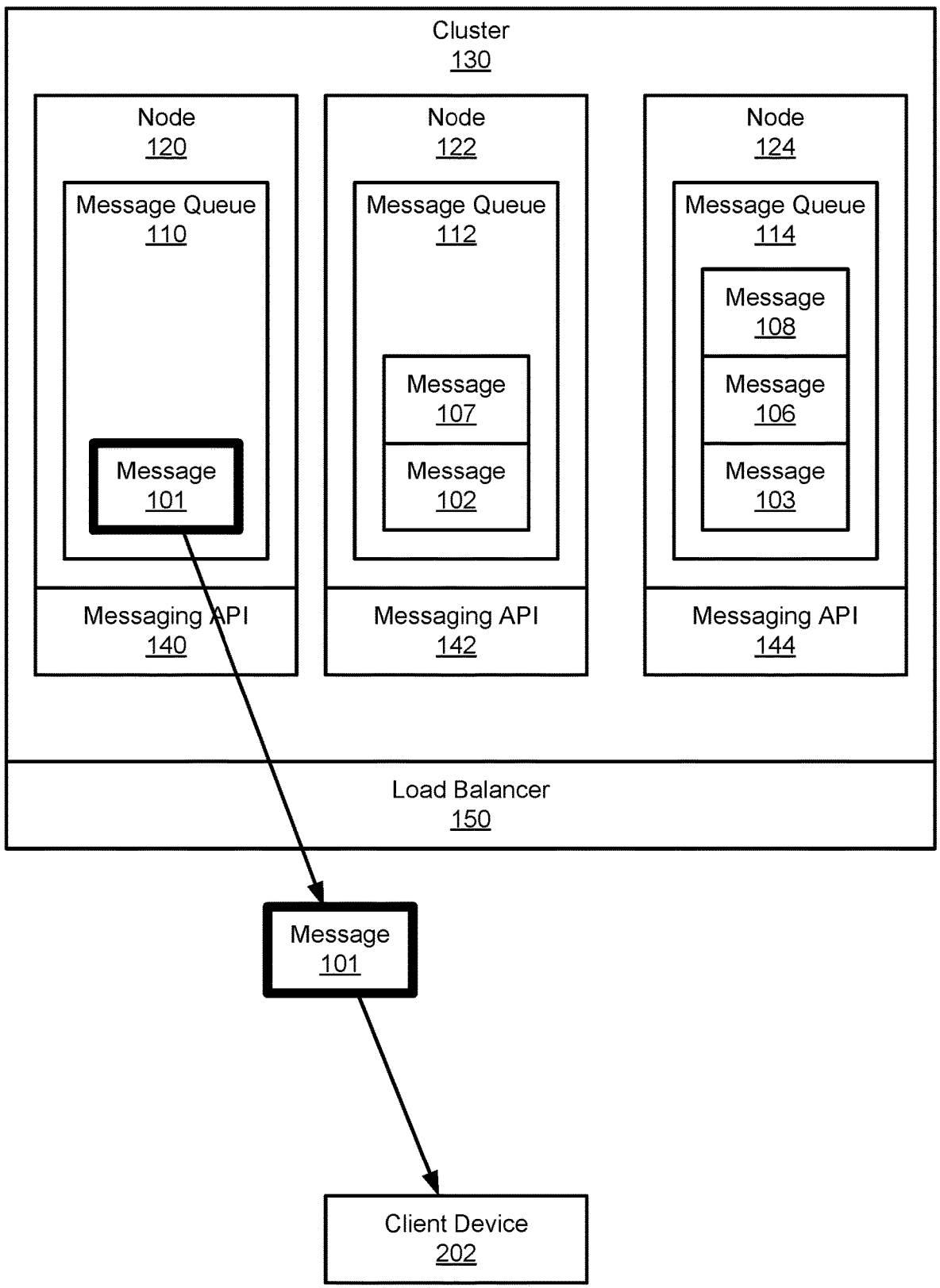
FIG. 5A illustrates an example of how a client device may cycle through a plurality of node addresses to retrieve messages from the nodes by addressing the nodes directly, according to some embodiments.

FIG. 5A illustrates an example of how a client device may cycle through a plurality of node addresses to retrieve messages from the nodes by addressing the nodes directly, according to some embodiments. Instead of sending request to the load balancer 150 to retrieve a message from any of the available messaging APIs 140, 142, 144, some embodiments may instead use the node addresses accessed above to send a request directly to the messaging API of a corresponding node. This effectively bypasses the load balancer 150 and allows the client device 202 to control which nodes are accessed. As described above, this allows the client device 202 to ensure that messages are not stranded for a prolonged period in a node that is not selected by the load balancer 150.

Any method of cycling through the plurality of node addresses may be used. For example, some embodiments may use a round-robin pattern to cycle through the node addresses. This may include addressing a first node and retrieving a message from the first node, then moving to a second node and retrieving a message from the second node, then moving to a third node and retrieving a message from the third node, and so forth. When the last address in the list has been accessed, the algorithm may start again at the first node and continue accessing nodes in sequence as long as they still have messages available in their respective queues. Cycling sequentially through nodes ensures that nodes are not skipped for prolonged intervals. This also ensures that each node is emptied at least once during each message retrieval session.

The example of FIG. 5A illustrates a first step in cycling through the plurality of node addresses. Instead of addressing the load balancer 150, the client device 202 may send a request directly to the messaging API 140 using the address of node 120 that was previously accessed by the client device 202 as described above. In response, the messaging API 140 may return a message 101 stored in the message queue 110 of node 120. Having retrieved a valid message from node 120, the status of the node address for node 120 may continue to indicate that additional messages may still be available at node 120. For example, the status may include a Boolean TRUE value or other value used to indicate more messages are available according to each individual implementation. Receiving a message or a non-null response may indicate that more messages may be available.

In this example, retrieving message 101 would empty message queue 110. However, the client device 202 need not receive any indication that the message queue 110 is empty at this point. Instead, the messaging API 140 may provide such an indication when a message request is subsequently received as described below. However, in some embodiments, the messaging API 140 may provide an indication that message 101 was the last message in the message queue 110. In this case, the status may be updated proactively such that no additional messages need be sent to the node. Therefore, a response from the node indicating that no messages are available at the corresponding node may be received when the last message is transmitted and/or when a subsequent request is received after the last message is transmitted.

Figure 5B:
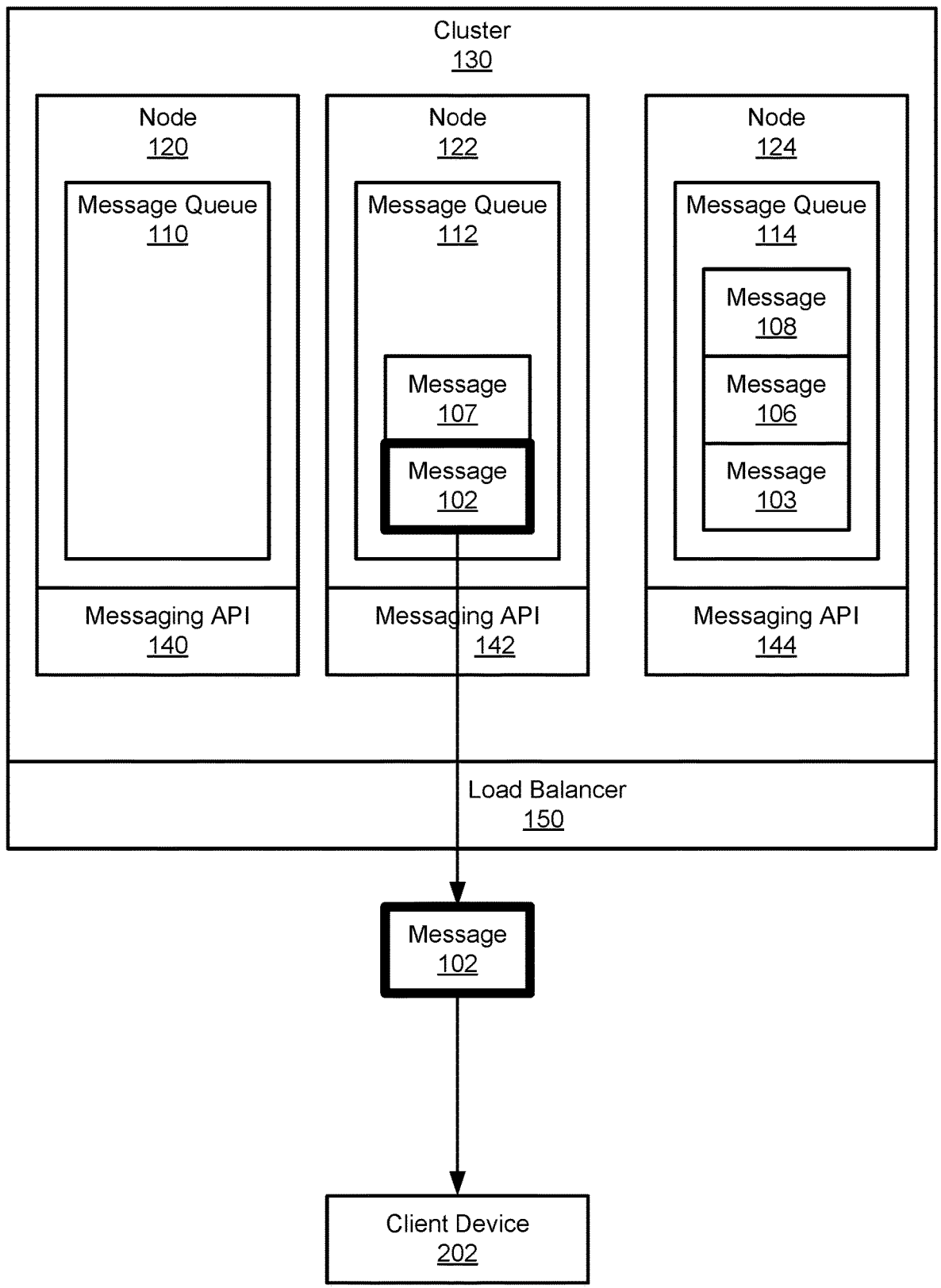
FIG. 5B illustrates how subsequent messages can be retrieved from other nodes as the client device cycles through the available node addresses, according to some embodiments.

FIG. 5B illustrates how subsequent messages can be retrieved from other nodes as the client device cycles through the available node addresses, according to some embodiments. In this example, the next address in the list of node addresses may be used to directly send a request to the messaging API 142 of node 122. In response to receiving the request, the messaging API 142 can retrieve the first available message 102 and return the message 102 as a response to the client device 202. Note that the message queue 112 for node 122 may still include message 107.

In this example, cycling through the plurality of node addresses included sequentially moving from one node address to the next in the list of node addresses. Other embodiments may use different methods of cycling through the node addresses. For example, some embodiments may randomly select node addresses such that they are not accessed sequentially, but such that each node address is accessed at least once before any node address is accessed twice. This avoids duplicating the problem of the load balancer 150 where one or more nodes do not receive enough message requests to empty their queues. Other embodiments may use other patterns such as selecting every other address in the list of node addresses to move through odd-numbered indexes then even-numbered indexes. In short, any pattern may be used to select from the available node addresses for each pass through all of the available node addresses in the list.

In some embodiments, the distribution of message retrieval requests across the various nodes 120, 122, 124 in the cluster 130 may emulate a method of load-balancing used by the load balancer. For example, if the load balancer 150 distributes message submissions based on message traffic to individual nodes, then this message traffic may also be used to generate a pattern for message retrieval requests by the client device 202. For example, if the load balancer 150 sees a relatively small amount of message traffic (e.g., below a predetermined or dynamic threshold amount) on node 124, then most of the message submissions may be routed to node 124, resulting in the message queue 114 having more messages than other message queues. Similarly, the client device 202 may have access to the same request traffic statistics used by the load balancer 150. The client device 202 may then determine to follow the same pattern for distributing some requests while still ensuring that each node is visited. For example, the client device 202 may begin each cycle through the node addresses with node 124, as it is likely to have the most messages in its queue 114. In some cases, matching load balancer traffic may cause the client device 202 to send request messages multiple times from some nodes before other nodes. For example, for a node that is suspected of having more messages in its message queue based on messaging traffic, the algorithm may send to consecutive message retrieval requests to that node before moving onto the next node.

Figure 5C:
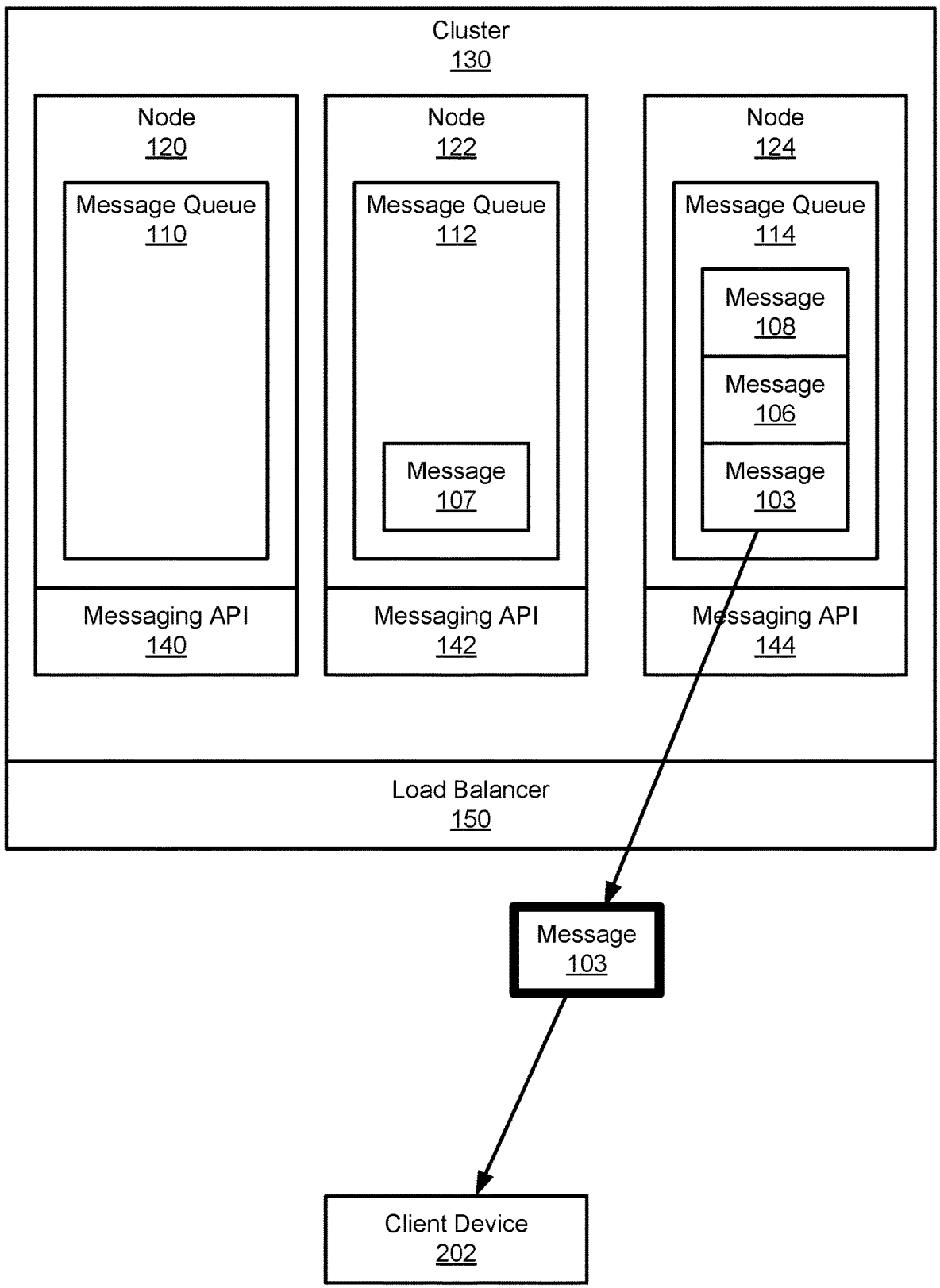
FIG. 5C illustrates how a cycle may be completed through the node address list, according to some embodiments.

FIG. 5C illustrates how a cycle may be completed through the node address list, according to some embodiments. At this point, it may be assumed that messages have been retrieved from both node 120 and node 122, as well as any other nodes not expressly shown in FIG. 5C that include instances of the distributed messaging service. Node 124 may be the last node in the list of node addresses to be accessed for the first time. Again, the client device 202 may send a message directly to the messaging API 104 requesting a message from node 124. Message 103 may be retrieved from the message queue 114 for node 124.

In this example, the first request to each of the nodes 120, 122, 124 produced a message that was returned to the client device 202. Therefore, some embodiments may still list a status for each of the addresses of the nodes 120, 122, 124 as being valid or possibly including additional messages. Cycling through the node addresses may now continue by sending message retrieval requests to each node for a second time. The order in which messages are sent to each of the nodes may be the same as was used in the first pass through the node address list, or some embodiments may use a different pattern of accessing nodes. For example, a round-robin scheme may be used during a first pass through the list to eliminate any empty nodes from the active address list, and an ordering based on message traffic statistics may be used for the second pass through the node addresses.

Figure 6A:
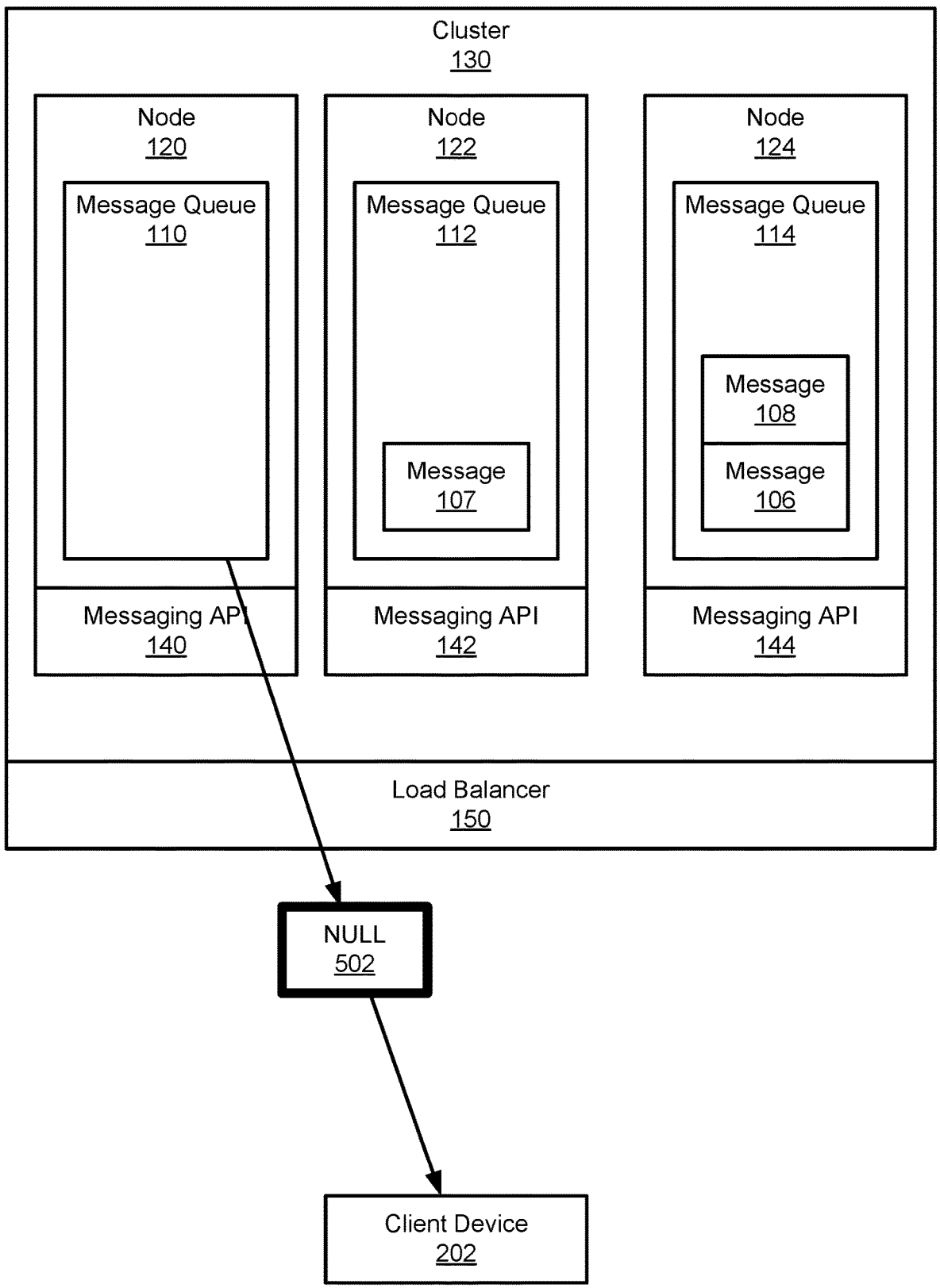
FIG. 6A illustrates the beginning of a second pass through the node addresses as the client device continues to cycle through node addresses to retrieve messages, according to some embodiments.

FIG. 6A illustrates the beginning of a second pass through the node addresses as the client device continues to cycle through node addresses to retrieve messages, according to some embodiments. In this example, a message retrieval request is sent to the messaging API 140 of node 120. However, the message queue 110 for node 120 is empty, having provided its only message during a previous cycle through the node addresses. Instead of returning a valid message, the messaging API 140 may instead return a response indicating that no messages are available at the corresponding node 120. For example, a NULL response 502 may be received instead of a message. In other examples, empty messages or message headers with predefined values may be received indicating that no messages are available.

At this point, the client device 202 may determine that the message queue 110 of node 120 is empty. Some embodiments may then remove the node address for node 120 from the plurality of node addresses that are cycled through to retrieve messages. Some embodiment may remove the node address from the list such that the list no longer includes the node address. This may include removing a row from a database table or removing an entry from a list. Other embodiments may remove the node address from the addresses that are cycled through by changing a status of the address in the list.

Figure 6B:
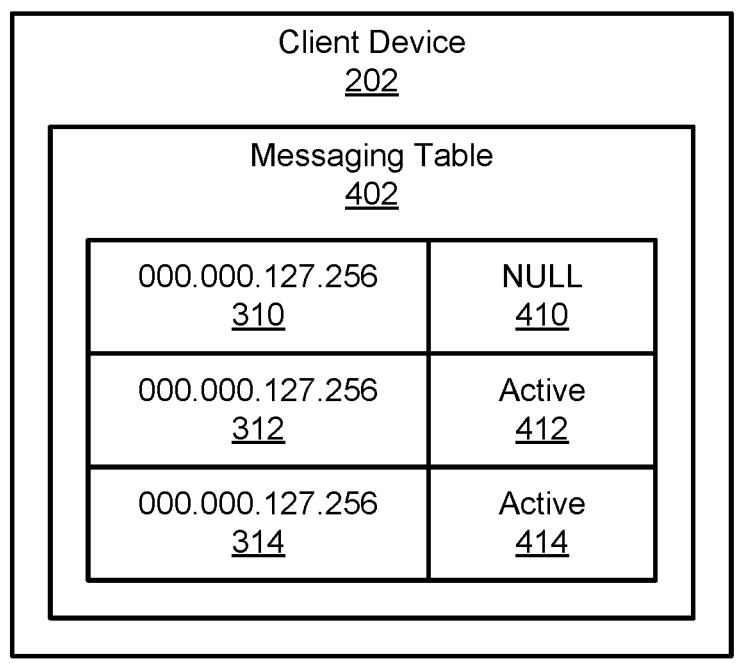
FIG. 6B illustrates a data structure that stores node addresses and statuses as it is updated during a message retrieval session, according to some embodiments.

FIG. 6B illustrates a data structure that stores node addresses and statuses as it is updated during a message retrieval session, according to some embodiments. Note that each of the node addresses is still included in the messaging table 402. However, the status 410 for the node address 310 of node 120 has been changed to NULL. This may effectively remove the node address from the addresses that are used for retrieving messages from the messaging queues. For example, on a subsequent pass through the node addresses 310, 312, 314 in the messaging table 402, the client device 202 may skip address 310 based on the status 410 being NULL. This ensures that each message queue is emptied during a messaging session, and this also ensures that unnecessary message requests are not sent repeatedly to nodes with empty messaging queues.

Figure 7A:
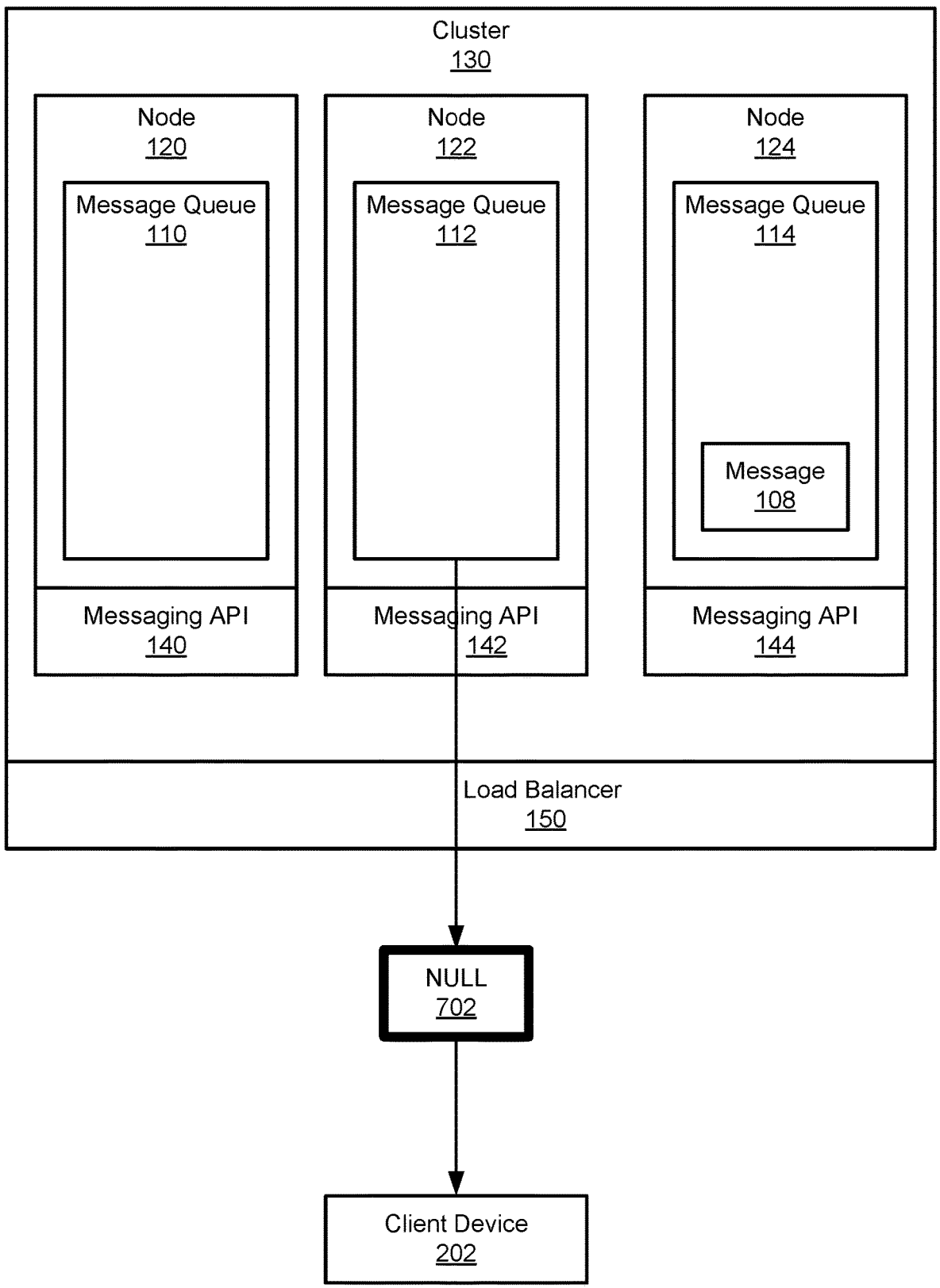
FIG. 7A illustrates a third pass through the active node addresses during the message retrieval session, according to some embodiments.

FIG. 7A illustrates a third pass through the active node addresses during the message retrieval session, according to some embodiments. Continuing on from FIG. 6A, it may be assumed that message 107 was retrieved from message queue 112, and message 106 was retrieved from message queue 114. Instead of cycling back to node 120, the client device 202 can skip node 120 because the corresponding node address may have already been removed and/or had it status changed such that it is removed from the rotation. Instead, the beginning of the third cycle through the nodes of the cluster 130 may begin on node 122. However, node 122 now has a message queue 112 that is empty. Therefore, after addressing the messaging API 142 directly, the messaging API 142 may return a null response 702 to the client device 202. The client device 202 may then remove the node address for node 122 from the rotation by removing the address from the list and/or otherwise indicating that it no longer includes additional messages.

Figure 7B:
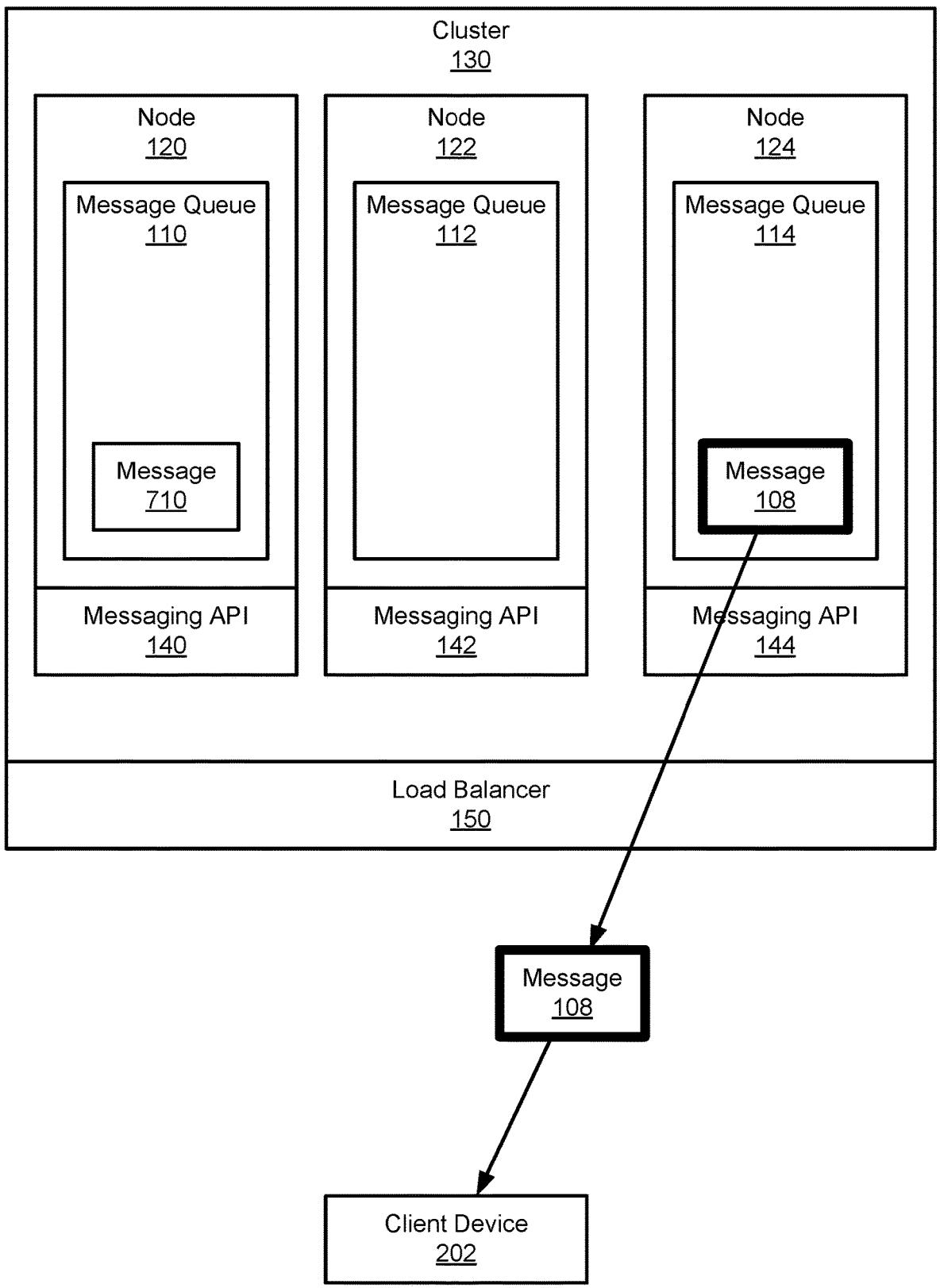
FIG. 7B illustrates how messages can begin to refill exhausted message queues during a current message retrieval session, according to some embodiments.

FIG. 7B illustrates how messages can begin to refill exhausted message queues during a current message retrieval session, according to some embodiments. Continuing from FIG. 7A the client device 202 may next directly address messaging API 144 for node 124 and retrieve message 108 from the message queue 114. While extracting the final message 108 from node 124, a new message 710 may be stored in the message queue 110 for node 120. This message 710 may be addressed to the client device 202, and may be submitted from another client device through the load balancer 150. As described above, the load balancer 150 may send the message 710 to node 120 based on message traffic and/or any other metric used by the load balancer 150.

Different embodiments may handle the arrival of message 710 in different ways. Some embodiments may simply leave message 710 in message queue 110 until a subsequent message retrieval session is initiated. Since the node address for node 120 has already been marked as empty, the algorithm that cycles through nodes in the cluster 130 need not return to node 120 during the session. These embodiments guarantee that messages that are in each of the queues 110, 112, 114 at the initiation of the message retrieval session will be retrieved. Messages that arrive during the message retrieval session may be retrieved depending on their arrival time and whether or not the receiving node has already been emptied by the client device 202. Other embodiments may make a second pass through the nodes of the cluster 130 after the last node has been emptied. For example, after retrieving message 108 from node 124, a subsequent request would mark this last node 124 as being empty. After all of the nodes in the cluster 130 or marked as empty, the algorithm may make one more pass through all of the nodes to ensure that they remain empty and to otherwise retrieve any messages that arrived during the message retrieval session. This process may be repeated until each of the nodes in the cluster 130 are checked sequentially and return an indication that their respective queues are empty.

Figure 8:
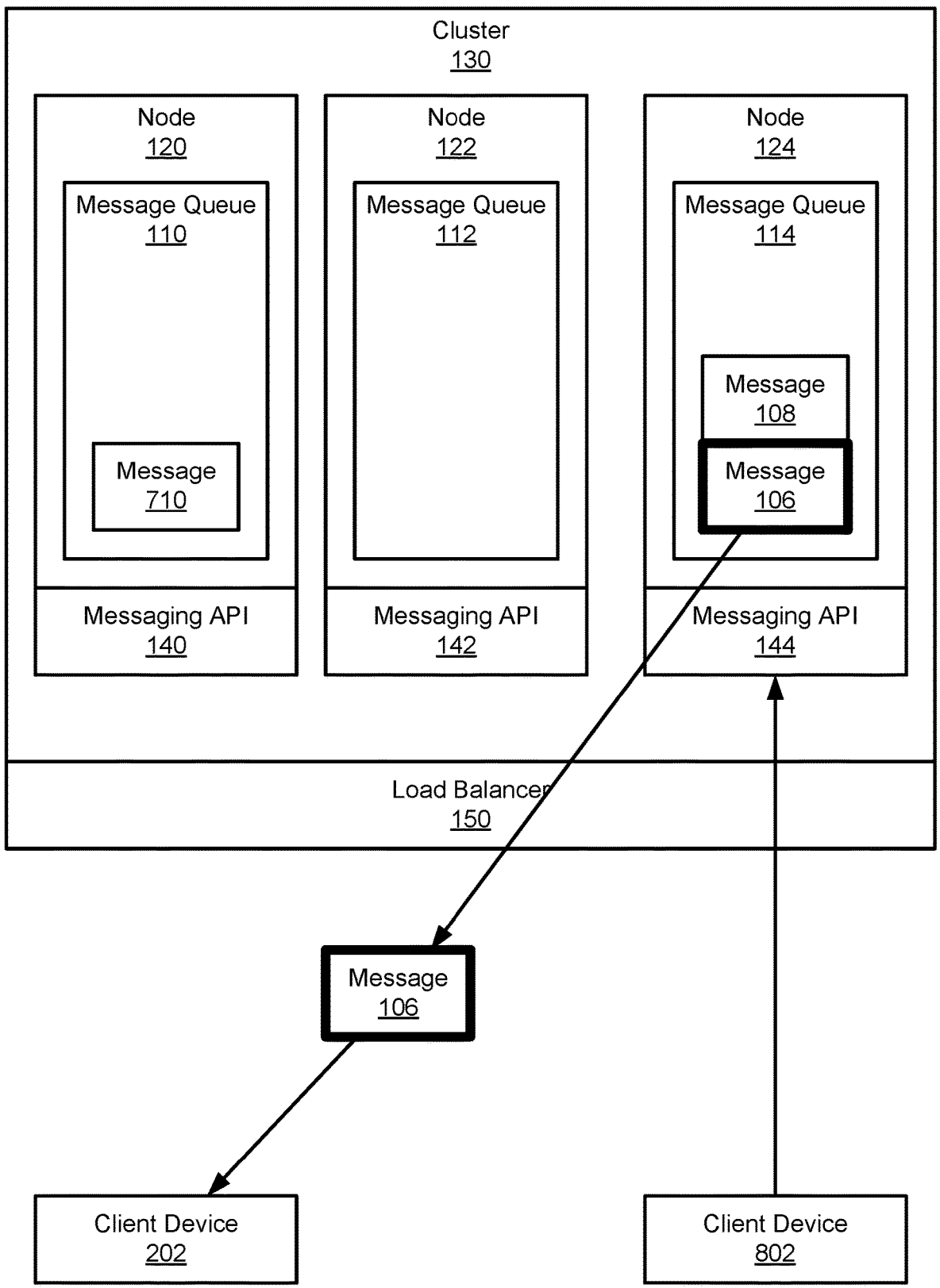
FIG. 8 illustrates how the distributed message service operates with a distributed client, according to some embodiments.

FIG. 8 illustrates how the distributed message service operates with a distributed client, according to some embodiments. Just as the instances of the distributed messaging service may be spread across various nodes in a cluster 130, a client service for retrieving messages may be distributed between a number of different client devices 202, 802. In this example, client device 202 and client device 802 may both submit requests directly to the messaging API 144 of node 124. The messaging service on node 124 may a lock message 106 for retrieval by client device 202, while the messaging service on node 124 may also lock message 108 for client device 802. This compatibility with distributed clients may be part of the messaging service that is not interrupted by directly addressing the messaging API 104 rather than submitting requests through the load balancer 150.

Figure 9:
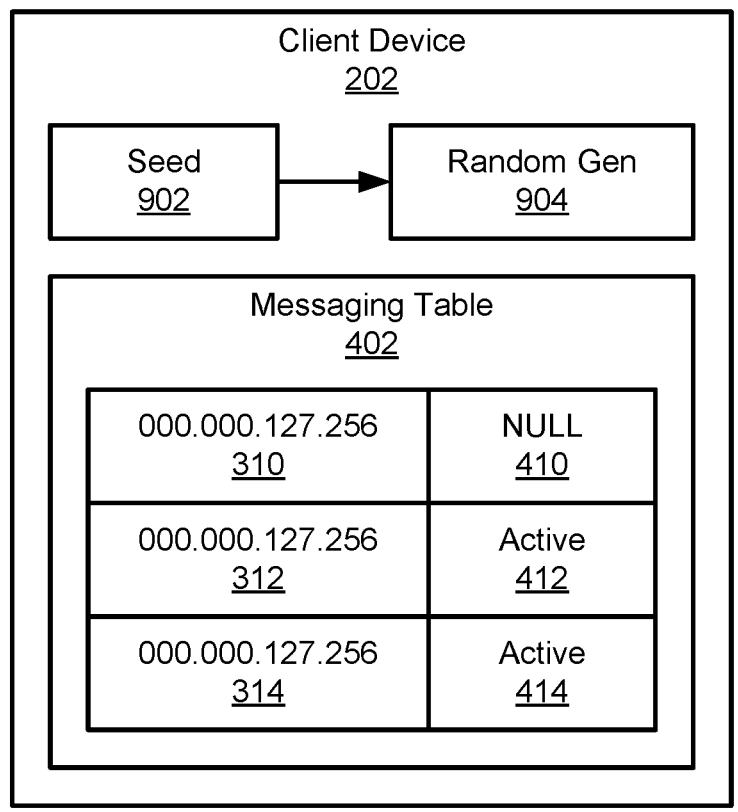
FIG. 9 illustrates a random number generator for determining an order for accessing nodes when cycling through node addresses, according to some embodiments.

FIG. 9 illustrates a random number generator for determining an order for accessing nodes when cycling through node addresses, according to some embodiments. In a distributed client system, it may be beneficial to have each client device start on a different node in the cluster 130. In order to provide different starting nodes for each distributed client, the client device 202 may include a random number generator 904 that can be used to generate a number corresponding to one of the node addresses in the messaging table 402. A seed 902 may be retrieved from a source that is unique to that client, such as a client ID or hardware ID to increase the probability that each distributed client generates a different starting node address from the messaging table 402.

Figure 10:
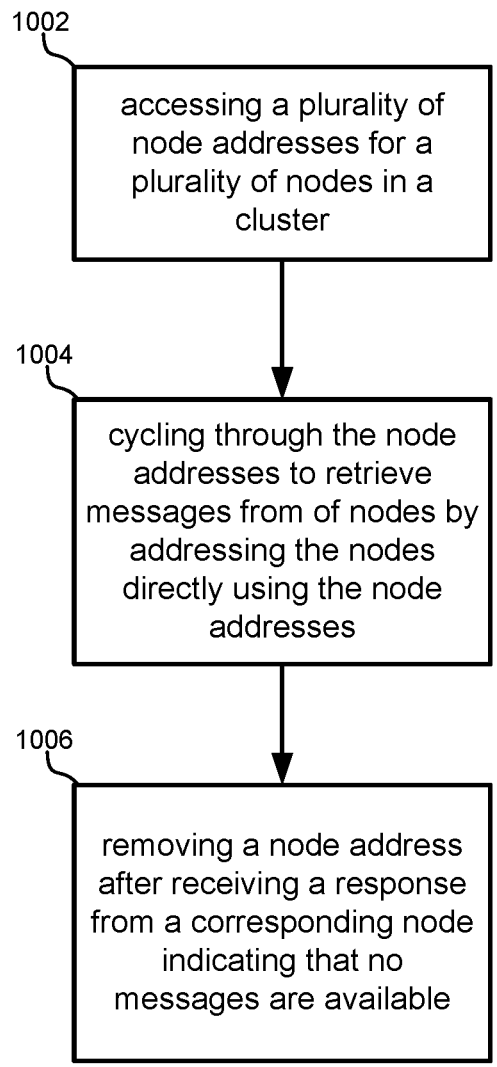
FIG. 10 illustrates a flowchart of a method for retrieving messages in a distributed messaging system, according to some embodiments.

FIG. 10 illustrates a flowchart of a method for retrieving messages in a distributed messaging system, according to some embodiments. The method may include accessing a plurality of node addresses for a plurality of nodes in a cluster (1002). A messaging service may be distributed across the plurality of nodes in the cluster, where each of the plurality of nodes includes a copy of an instance of the messaging service. The cluster may include other nodes that provide other services, and a load balancer may distribute incoming requests to various nodes based on request traffic or other statistical methodologies as described above in relation to FIGS. 1-2. The node addresses may be retrieved and/or stored in a data structure at the client device as described above in relation to FIGS. 3-4.

The method may additionally include cycling through the plurality of node addresses to retrieve messages from the plurality of nodes by addressing the plurality of nodes directly using the plurality of node addresses (1004). Addressing the nodes directly may bypass the load balancer to send messages directly to individual nodes, which may include a messaging API for receiving and responding to requests for messages. The messaging APIs may respond by providing one or more messages from a message queue or by providing a NULL response when the messaging queue is empty. The node addresses may be cycled through using any of the methods described above in FIGS. 5-8.

The method may further include removing a node address from the plurality of node addresses after receiving a response from a corresponding node indicating that no messages are available at the corresponding node (1006). Removing the node address may include changing a status of the node address in a messaging table or other data structure. Node addresses may be removed from the cycling procedure using any of the methods described above in FIGS. 5-9.

It should be appreciated that the specific steps illustrated in FIG. 10 provide particular methods of retrieving messages in a distributed messaging system according to various embodiments. Other sequences of steps may also be performed according to alternative embodiments. For example, alternative embodiments may perform the steps outlined above in a different order. Moreover, the individual steps illustrated in FIG. 10 may include multiple sub-steps that may be performed in various sequences as appropriate to the individual step. Furthermore, additional steps may be added or removed depending on the particular applications. Many variations, modifications, and alternatives also fall within the scope of this disclosure.

Each of the methods described herein may be implemented by a computer system. Each step of these methods may be executed automatically by the computer system, and/or may be provided with inputs/outputs involving a user. For example, a user may provide inputs for each step in a method, and each of these inputs may be in response to a specific output requesting such an input, wherein the output is generated by the computer system. Each input may be received in response to a corresponding requesting output. Furthermore, inputs may be received from a user, from another computer system as a data stream, retrieved from a memory location, retrieved over a network, requested from a web service, and/or the like. Likewise, outputs may be provided to a user, to another computer system as a data stream, saved in a memory location, sent over a network, provided to a web service, and/or the like. In short, each step of the methods described herein may be performed by a computer system, and may involve any number of inputs, outputs, and/or requests to and from the computer system which may or may not involve a user. Those steps not involving a user may be said to be performed automatically by the computer system without human intervention. Therefore, it will be understood in light of this disclosure, that each step of each method described herein may be altered to include an input and output to and from a user, or may be done automatically by a computer system without human intervention where any determinations are made by a processor. Furthermore, some embodiments of each of the methods described herein may be implemented as a set of instructions stored on a tangible, non-transitory storage medium to form a tangible software product.

Figure 11:
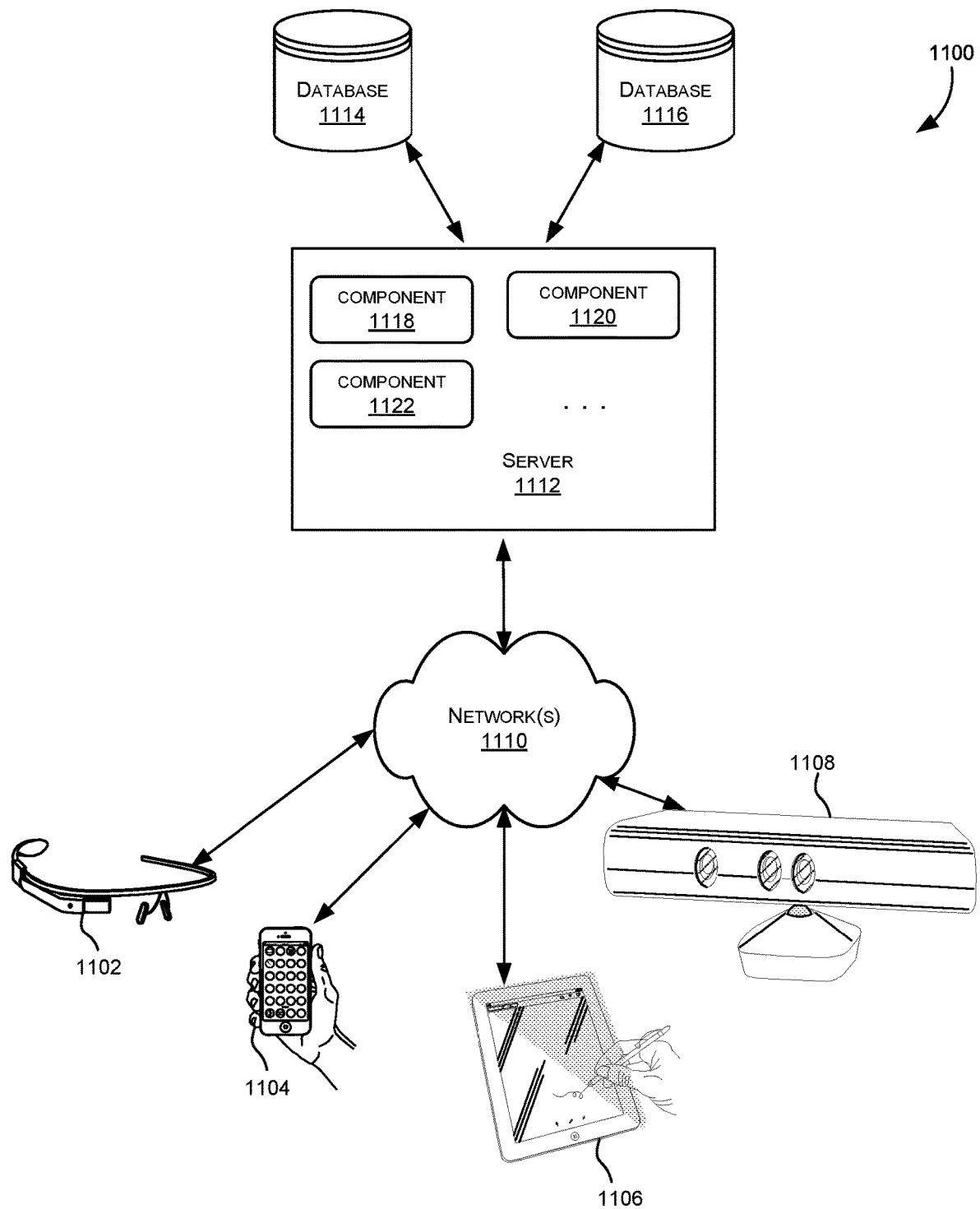
FIG. 11 illustrates a simplified block diagram of a distributed system for implementing some of the embodiments.

FIG. 11 depicts a simplified diagram of a distributed system 1100 for implementing one of the embodiments. In the illustrated embodiment, distributed system 1100 includes one or more client computing devices 1102, 1104, 1106, and 1108, which are configured to execute and operate a client application such as a web browser, proprietary client (e.g., Oracle Forms), or the like over one or more network(s) 1110. Server 1112 may be communicatively coupled with remote client computing devices 1102, 1104, 1106, and 1108 via network 1110.

In various embodiments, server 1112 may be adapted to run one or more services or software applications provided by one or more of the components of the system. In some embodiments, these services may be offered as web-based or cloud services or under a Software as a Service (SaaS) model to the users of client computing devices 1102, 1104, 1106, and/or 1108. Users operating client computing devices 1102, 1104, 1106, and/or 1108 may in turn utilize one or more client applications to interact with server 1112 to utilize the services provided by these components.

In the configuration depicted in the figure, the software components 1118, 1120 and 1122 of system 1100 are shown as being implemented on server 1112. In other embodiments, one or more of the components of system 1100 and/or the services provided by these components may also be implemented by one or more of the client computing devices 1102, 1104, 1106, and/or 1108. Users operating the client computing devices may then utilize one or more client applications to use the services provided by these components. These components may be implemented in hardware, firmware, software, or combinations thereof. It should be appreciated that various different system configurations are possible, which may be different from distributed system 1100. The embodiment shown in the figure is thus one example of a distributed system for implementing an embodiment system and is not intended to be limiting.

Client computing devices 1102, 1104, 1106, and/or 1108 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 1102, 1104, 1106, and 1108 may be any other electronic device, such as a thin-client computer, an Internet-enabled gaming system (e.g., a Microsoft Xbox gaming console with or without a Kinect® gesture input device), and/or a personal messaging device, capable of communicating over network(s) 1110.

Although exemplary distributed system 1100 is shown with four client computing devices, any number of client computing devices may be supported. Other devices, such as devices with sensors, etc., may interact with server 1112.

Network(s) 1110 in distributed system 1100 may be any type of network that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 1110 can be a local area network (LAN), such as one based on Ethernet, Token-Ring and/or the like. Network(s) 1110 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 1112 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 1112 may be adapted to run one or more services or software applications described in the foregoing disclosure. For example, server 1112 may correspond to a server for performing processing described above according to an embodiment of the present disclosure.

Server 1112 may run an operating system including any of those discussed above, as well as any commercially available server operating system. Server 1112 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 1112 may include one or more applications to analyze and consolidate data feeds and/or event updates received from users of client computing devices 1102, 1104, 1106, and 1108. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 1112 may also include one or more applications to display the data feeds and/or real-time events via one or more display devices of client computing devices 1102, 1104, 1106, and 1108.

Distributed system 1100 may also include one or more databases 1114 and 1116. Databases 1114 and 1116 may reside in a variety of locations. By way of example, one or more of databases 1114 and 1116 may reside on a non-transitory storage medium local to (and/or resident in) server 1112. Alternatively, databases 1114 and 1116 may be remote from server 1112 and in communication with server 1112 via a network-based or dedicated connection. In one set of embodiments, databases 1114 and 1116 may reside in a storage-area network (SAN). Similarly, any necessary files for performing the functions attributed to server 1112 may be stored locally on server 1112 and/or remotely, as appropriate. In one set of embodiments, databases 1114 and 1116 may include relational databases, such as databases provided by Oracle, that are adapted to store, update, and retrieve data in response to SQL-formatted commands.

Figure 12:
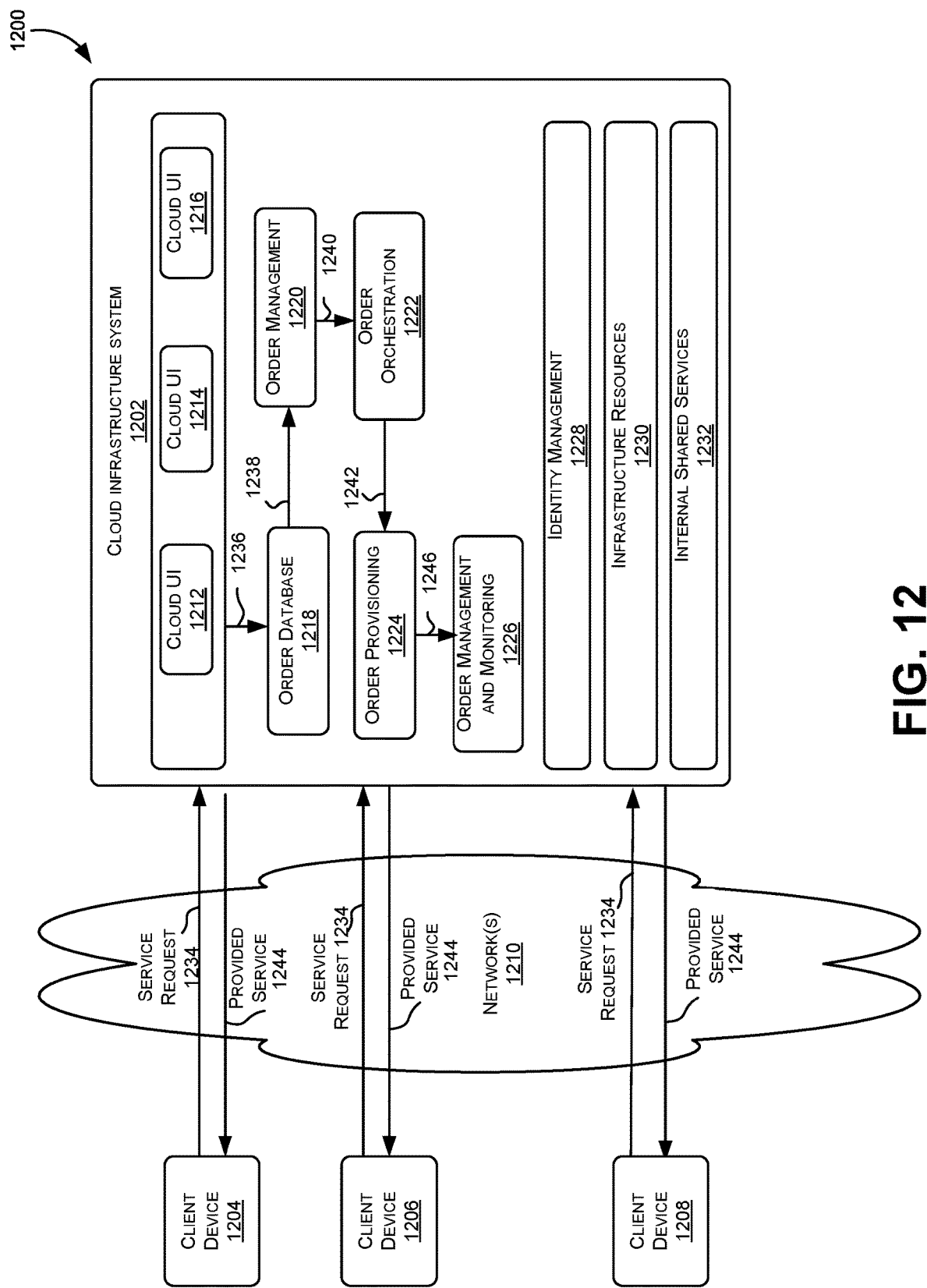
FIG. 12 illustrates a simplified block diagram of components of a system environment by which services provided by the components of an embodiment system may be offered as cloud services.

FIG. 12 is a simplified block diagram of one or more components of a system environment 1200 by which services provided by one or more components of an embodiment system may be offered as cloud services, in accordance with an embodiment of the present disclosure. In the illustrated embodiment, system environment 1200 includes one or more client computing devices 1204, 1206, and 1208 that may be used by users to interact with a cloud infrastructure system 1202 that provides cloud services. The client computing devices may be configured to operate a client application such as a web browser, a proprietary client application (e.g., Oracle Forms), or some other application, which may be used by a user of the client computing device to interact with cloud infrastructure system 1202 to use services provided by cloud infrastructure system 1202.

It should be appreciated that cloud infrastructure system 1202 depicted in the figure may have other components than those depicted. Further, the system shown in the figure is only one example of a cloud infrastructure system that may incorporate some embodiments. In some other embodiments, cloud infrastructure system 1202 may have more or fewer components than shown in the figure, may combine two or more components, or may have a different configuration or arrangement of components.

Client computing devices 1204, 1206, and 1208 may be devices similar to those described above for 1102, 1104, 1106, and 1108.

Although exemplary system environment 1200 is shown with three client computing devices, any number of client computing devices may be supported. Other devices such as devices with sensors, etc. may interact with cloud infrastructure system 1202.

Network(s) 1210 may facilitate communications and exchange of data between clients 1204, 1206, and 1208 and cloud infrastructure system 1202. Each network may be any type of network that can support data communications using any of a variety of commercially-available protocols, including those described above for network(s) 1110.

Cloud infrastructure system 1202 may comprise one or more computers and/or servers that may include those described above for server 1112.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 1202 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 1202 may be adapted to automatically provision, manage and track a customer's subscription to services offered by cloud infrastructure system 1202. Cloud infrastructure system 1202 may provide the cloud services via different deployment models. For example, services may be provided under a public cloud model in which cloud infrastructure system 1202 is owned by an organization selling cloud services (e.g., owned by Oracle) and the services are made available to the general public or different industry enterprises. As another example, services may be provided under a private cloud model in which cloud infrastructure system 1202 is operated solely for a single organization and may provide services for one or more entities within the organization. The cloud services may also be provided under a community cloud model in which cloud infrastructure system 1202 and the services provided by cloud infrastructure system 1202 are shared by several organizations in a related community. The cloud services may also be provided under a hybrid cloud model, which is a combination of two or more different models.

In some embodiments, the services provided by cloud infrastructure system 1202 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1202. Cloud infrastructure system 1202 then performs processing to provide the services in the customer's subscription order.

In some embodiments, the services provided by cloud infrastructure system 1202 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 1202 may also include infrastructure resources 1230 for providing the resources used to provide various services to customers of the cloud infrastructure system. In one embodiment, infrastructure resources 1230 may include pre-integrated and optimized combinations of hardware, such as servers, storage, and networking resources to execute the services provided by the PaaS platform and the SaaS platform.

In some embodiments, resources in cloud infrastructure system 1202 may be shared by multiple users and dynamically re-allocated per demand. Additionally, resources may be allocated to users in different time zones. For example, cloud infrastructure system 1230 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 1232 may be provided that are shared by different components or modules of cloud infrastructure system 1202 and by the services provided by cloud infrastructure system 1202. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 1202 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 1202, and the like.

In one embodiment, as depicted in the figure, cloud management functionality may be provided by one or more modules, such as an order management module 1220, an order orchestration module 1222, an order provisioning module 1224, an order management and monitoring module 1226, and an identity management module 1228. These modules may include or be provided using one or more computers and/or servers, which may be general purpose computers, specialized server computers, server farms, server clusters, or any other appropriate arrangement and/or combination.

In exemplary operation 1234, a customer using a client device, such as client device 1204, 1206 or 1208, may interact with cloud infrastructure system 1202 by requesting one or more services provided by cloud infrastructure system 1202 and placing an order for a subscription for one or more services offered by cloud infrastructure system 1202. In certain embodiments, the customer may access a cloud User Interface (UI), cloud UI 1212, cloud UI 1214 and/or cloud UI 1216 and place a subscription order via these UIs. The order information received by cloud infrastructure system 1202 in response to the customer placing an order may include information identifying the customer and one or more services offered by the cloud infrastructure system 1202 that the customer intends to subscribe to.

After an order has been placed by the customer, the order information is received via the cloud UIs, 1212, 1214 and/or 1216.

At operation 1236, the order is stored in order database 1218. Order database 1218 can be one of several databases operated by cloud infrastructure system 1218 and operated in conjunction with other system elements.

At operation 1238, the order information is forwarded to an order management module 1220. In some instances, order management module 1220 may be configured to perform billing and accounting functions related to the order, such as verifying the order, and upon verification, booking the order.

At operation 1240, information regarding the order is communicated to an order orchestration module 1222. Order orchestration module 1222 may utilize the order information to orchestrate the provisioning of services and resources for the order placed by the customer. In some instances, order orchestration module 1222 may orchestrate the provisioning of resources to support the subscribed services using the services of order provisioning module 1224.

In certain embodiments, order orchestration module 1222 enables the management of business processes associated with each order and applies business logic to determine whether an order should proceed to provisioning. At operation 1242, upon receiving an order for a new subscription, order orchestration module 1222 sends a request to order provisioning module 1224 to allocate resources and configure those resources needed to fulfill the subscription order. Order provisioning module 1224 enables the allocation of resources for the services ordered by the customer. Order provisioning module 1224 provides a level of abstraction between the cloud services provided by cloud infrastructure system 1200 and the physical implementation layer that is used to provision the resources for providing the requested services. Order orchestration module 1222 may thus be isolated from implementation details, such as whether or not services and resources are actually provisioned on the fly or pre-provisioned and only allocated/assigned upon request.

At operation 1244, once the services and resources are provisioned, a notification of the provided service may be sent to customers on client devices 1204, 1206 and/or 1208 by order provisioning module 1224 of cloud infrastructure system 1202.

At operation 1246, the customer's subscription order may be managed and tracked by an order management and monitoring module 1226. In some instances, order management and monitoring module 1226 may be configured to collect usage statistics for the services in the subscription order, such as the amount of storage used, the amount data transferred, the number of users, and the amount of system up time and system down time.

In certain embodiments, cloud infrastructure system 1200 may include an identity management module 1228. Identity management module 1228 may be configured to provide identity services, such as access management and authorization services in cloud infrastructure system 1200. In some embodiments, identity management module 1228 may control information about customers who wish to utilize the services provided by cloud infrastructure system 1202. Such information can include information that authenticates the identities of such customers and information that describes which actions those customers are authorized to perform relative to various system resources (e.g., files, directories, applications, communication ports, memory segments, etc.) Identity management module 1228 may also include the management of descriptive information about each customer and about how and by whom that descriptive information can be accessed and modified.

Figure 13:
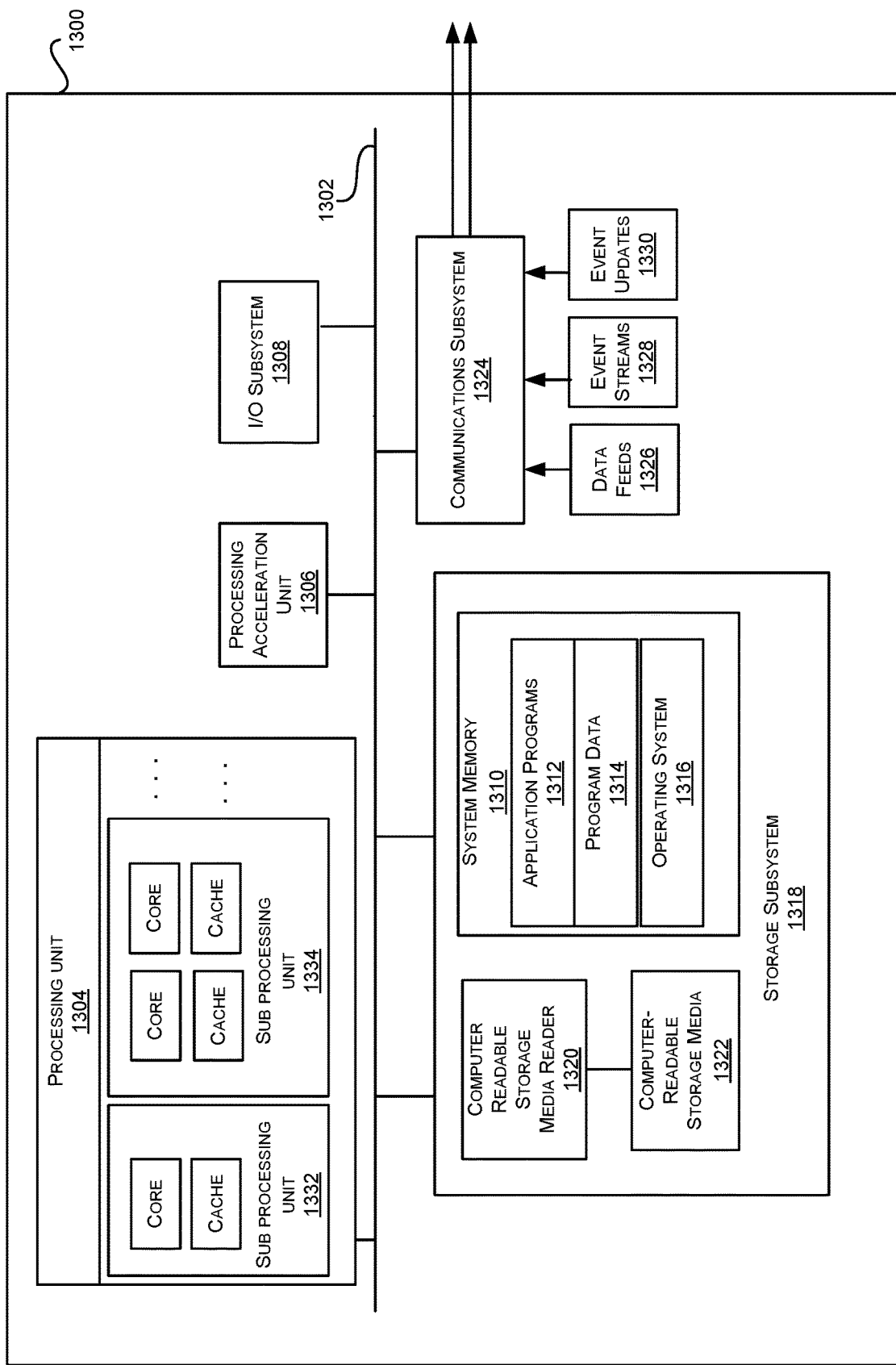
FIG. 13 illustrates an exemplary computer system, in which various embodiments may be implemented.

FIG. 13 illustrates an exemplary computer system 1300, in which various embodiments may be implemented. The system 1300 may be used to implement any of the computer systems described above. As shown in the figure, computer system 1300 includes a processing unit 1304 that communicates with a number of peripheral subsystems via a bus subsystem 1302. These peripheral subsystems may include a processing acceleration unit 1306, an I/O subsystem 1308, a storage subsystem 1318 and a communications subsystem 1324. Storage subsystem 1318 includes tangible computer-readable storage media 1322 and a system memory 1310.

Bus subsystem 1302 provides a mechanism for letting the various components and subsystems of computer system 1300 communicate with each other as intended. Although bus subsystem 1302 is shown schematically as a single bus, alternative embodiments of the bus subsystem may utilize multiple buses. Bus subsystem 1302 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1304, which can be implemented as one or more integrated circuits (e.g., a conventional microprocessor or microcontroller), controls the operation of computer system 1300. One or more processors may be included in processing unit 1304. These processors may include single core or multicore processors. In certain embodiments, processing unit 1304 may be implemented as one or more independent processing units 1332 and/or 1334 with single or multicore processors included in each processing unit. In other embodiments, processing unit 1304 may also be implemented as a quad-core processing unit formed by integrating two dual-core processors into a single chip.

In various embodiments, processing unit 1304 can execute a variety of programs in response to program code and can maintain multiple concurrently executing programs or processes. At any given time, some or all of the program code to be executed can be resident in processor(s) 1304 and/or in storage subsystem 1318. Through suitable programming, processor(s) 1304 can provide various functionalities described above. Computer system 1300 may additionally include a processing acceleration unit 1306, which can include a digital signal processor (DSP), a special-purpose processor, and/or the like.

I/O subsystem 1308 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1300 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1300 may comprise a storage subsystem 1318 that comprises software elements, shown as being currently located within a system memory 1310. System memory 1310 may store program instructions that are loadable and executable on processing unit 1304, as well as data generated during the execution of these programs.

Depending on the configuration and type of computer system 1300, system memory 1310 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1304. In some implementations, system memory 1310 may include multiple different types of memory, such as static random access memory (SRAM) or dynamic random access memory (DRAM). In some implementations, a basic input/output system (BIOS), containing the basic routines that help to transfer information between elements within computer system 1300, such as during start-up, may typically be stored in the ROM. By way of example, and not limitation, system memory 1310 also illustrates application programs 1312, which may include client applications, Web browsers, mid-tier applications, relational database management systems (RDBMS), etc., program data 1314, and an operating system 1316. By way of example, operating system 1316 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 1318 may also provide a tangible computer-readable storage medium for storing the basic programming and data constructs that provide the functionality of some embodiments. Software (programs, code modules, instructions) that when executed by a processor provide the functionality described above may be stored in storage subsystem 1318. These software modules or instructions may be executed by processing unit 1304. Storage subsystem 1318 may also provide a repository for storing data used in accordance with some embodiments.

Storage subsystem 1300 may also include a computer-readable storage media reader 1320 that can further be connected to computer-readable storage media 1322. Together and, optionally, in combination with system memory 1310, computer-readable storage media 1322 may comprehensively represent remote, local, fixed, and/or removable storage devices plus storage media for temporarily and/or more permanently containing, storing, transmitting, and retrieving computer-readable information.

Computer-readable storage media 1322 containing code, or portions of code, can also include any appropriate media, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1300.

By way of example, computer-readable storage media 1322 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1322 may include, but is not limited to, Zip® drives, flash memory cards, universal serial bus (USB) flash drives, secure digital (SD) cards, DVD disks, digital video tape, and the like. Computer-readable storage media 1322 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1300.

Communications subsystem 1324 provides an interface to other computer systems and networks. Communications subsystem 1324 serves as an interface for receiving data from and transmitting data to other systems from computer system 1300. For example, communications subsystem 1324 may enable computer system 1300 to connect to one or more devices via the Internet. In some embodiments communications subsystem 1324 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1324 can provide wired network connectivity (e.g., Ethernet) in addition to or instead of a wireless interface.

In some embodiments, communications subsystem 1324 may also receive input communication in the form of structured and/or unstructured data feeds 1326, event streams 1328, event updates 1330, and the like on behalf of one or more users who may use computer system 1300.

By way of example, communications subsystem 1324 may be configured to receive data feeds 1326 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1324 may also be configured to receive data in the form of continuous data streams, which may include event streams 1328 of real-time events and/or event updates 1330, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1324 may also be configured to output the structured and/or unstructured data feeds 1326, event streams 1328, event updates 1330, and the like to one or more databases that may be in communication with one or more streaming data source computers coupled to computer system 1300.

Computer system 1300 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1300 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, other ways and/or methods to implement the various embodiments should be apparent.

In the foregoing description, for the purposes of explanation, numerous specific details were set forth in order to provide a thorough understanding of various embodiments. It will be apparent, however, that some embodiments may be practiced without some of these specific details. In other instances, well-known structures and devices are shown in block diagram form.

The foregoing description provides exemplary embodiments only, and is not intended to limit the scope, applicability, or configuration of the disclosure. Rather, the foregoing description of various embodiments will provide an enabling disclosure for implementing at least one embodiment. It should be understood that various changes may be made in the function and arrangement of elements without departing from the spirit and scope of some embodiments as set forth in the appended claims.

Specific details are given in the foregoing description to provide a thorough understanding of the embodiments. However, it will be understood that the embodiments may be practiced without these specific details. For example, circuits, systems, networks, processes, and other components may have been shown as components in block diagram form in order not to obscure the embodiments in unnecessary detail. In other instances, well-known circuits, processes, algorithms, structures, and techniques may have been shown without unnecessary detail in order to avoid obscuring the embodiments.

Also, it is noted that individual embodiments may have been described as a process which is depicted as a flowchart, a flow diagram, a data flow diagram, a structure diagram, or a block diagram. Although a flowchart may have described the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to portable or fixed storage devices, optical storage devices, wireless channels and various other mediums capable of storing, containing, or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

In the foregoing specification, features are described with reference to specific embodiments thereof, but it should be recognized that not all embodiments are limited thereto. Various features and aspects of some embodiments may be used individually or jointly. Further, embodiments can be utilized in any number of environments and applications beyond those described herein without departing from the broader spirit and scope of the specification. The specification and drawings are, accordingly, to be regarded as illustrative rather than restrictive.

Additionally, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

What is claimed is:

1. A non-transitory computer-readable medium comprising instructions that, when executed by one or more processors, cause the one or more processors to perform operations comprising:
   accessing, by a client device, a plurality of node addresses for a plurality of nodes in a cluster, wherein a messaging service is distributed across the plurality of nodes in the cluster, and the client device is outside of the cluster, and wherein the cluster comprises a load balancer configured to receive requests to retrieve messages from the messaging service and to distribute the requests between the plurality of nodes based on request traffic;
   cycling, by the client device, through the plurality of node addresses to retrieve messages addressed to a user of the client device from the plurality of nodes by addressing the plurality of nodes directly using the plurality of node addresses, wherein addressing the plurality of nodes directly using the plurality of node addresses bypasses the load balancer; and
   removing, by the client device, a node address from the plurality of node addresses after receiving a response from a corresponding node indicating that no messages addressed to the user are available at the corresponding node.

2. The non-transitory computer-readable medium of claim 1, wherein the load balancer receives requests from client devices that do not address the plurality of nodes directly.

3. The non-transitory computer-readable medium of claim 1, wherein cycling through the plurality of node addresses to retrieve the messages from the plurality of nodes comprises:
   determining a pattern that the load balancer has used to distribute requests for messages to the plurality of nodes; and
   cycling through the plurality of node addresses based on the pattern.

4. The non-transitory computer-readable medium of claim 1, wherein the plurality of node addresses comprises IP addresses of the plurality of nodes.

5. The non-transitory computer-readable medium of claim 1, wherein the plurality of nodes comprise instances of the messaging service, and the instances of the messaging service operate independent of other instances of the messaging service.

6. The non-transitory computer-readable medium of claim 5, wherein the cluster comprises additional nodes that do not include the instances of the messaging service.

7. The non-transitory computer-readable medium of claim 5, wherein the instances of the messaging service comprise message queues.

8. The non-transitory computer-readable medium of claim 7, wherein the instances of the messaging service are configured to return a single message in a corresponding message queue when one or more messages are available, and to return a null response when the corresponding message queue is empty.

9. The non-transitory computer-readable medium of claim 1, wherein the operations further comprise sending a request to the cluster to retrieve the plurality of node addresses from the cluster.

10. The non-transitory computer-readable medium of claim 9, wherein the plurality of node addresses are retrieved through a Java Naming and Directory Interface (JNDI).

11. The non-transitory computer-readable medium of claim 1, wherein cycling through the plurality of node addresses to retrieve the messages from the plurality of nodes comprises:
    requesting a first message from a first node in the plurality of nodes;
    receiving the first message from the first node; and
    requesting a second message from a second node in the plurality of nodes after receiving the message from the first node.

12. The non-transitory computer-readable medium of claim 1, wherein cycling through the plurality of node addresses to retrieve the messages from the plurality of nodes comprises:
    using a Round Robin pattern to sequentially retrieve messages from the plurality of nodes until each of the plurality of nodes indicates that no messages are available.

13. The non-transitory computer-readable medium of claim 1, wherein removing the node address from the plurality of node addresses prevents requests to retrieve messages from being sent to the corresponding node until messages indicating that no messages are available at each remaining node in the plurality of nodes have been received.

14. The non-transitory computer-readable medium of claim 1, wherein the operations further comprise maintaining a data structure comprising the plurality of node addresses and a plurality of statuses indicating whether responses have been received indicating that no messages are available for the plurality of node addresses.

15. The non-transitory computer-readable medium of claim 14, wherein removing a node address from the plurality of node addresses comprises changing a corresponding status in the plurality of statuses.

16. The non-transitory computer-readable medium of claim 1, wherein cycling through the plurality of node addresses to retrieve the messages from the plurality of nodes comprises randomly determining a starting node address in the plurality of node addresses.

17. A method of retrieving messages in a distributed messaging system, the method comprising:
    accessing, by a client device, a plurality of node addresses for a plurality of nodes in a cluster, wherein a messaging service is distributed across the plurality of nodes in the cluster, and the client device is outside of the cluster, and wherein the cluster comprises a load balancer configured to receive requests to retrieve messages from the messaging service and to distribute the requests between the plurality of nodes based on request traffic;

cycling, by the client device, through the plurality of node addresses to retrieve messages addressed to a user of the client device from the plurality of nodes by addressing the plurality of nodes directly using the plurality of node addresses, wherein addressing the plurality of nodes directly using the plurality of node addresses bypasses the load balancer; and removing, by the client device, a node address from the plurality of node addresses after receiving a response from a corresponding node indicating that no messages addressed to the user are available at the corresponding node.

18. A system comprising:

one or more processors; and one or more memory devices comprising instructions that, when executed by the one or more processors, cause the one or more processors to perform operations comprising:

accessing, by a client device, a plurality of node addresses for a plurality of nodes in a cluster, wherein a messaging service is distributed across the plurality of nodes in the cluster, and the client device is outside of the cluster, and wherein the cluster comprises a load balancer configured to receive requests to retrieve messages from the messaging service and to distribute the requests between the plurality of nodes based on request traffic;

cycling, by the client device, through the plurality of node addresses to retrieve messages addressed to a user of the client device from the plurality of nodes by addressing the plurality of nodes directly using the plurality of node addresses, wherein addressing the plurality of nodes directly using the plurality of node addresses bypasses the load balancer; and removing, by the client device, a node address from the plurality of node addresses after receiving a response from a corresponding node indicating that no messages addressed to the user are available at the corresponding node.

* * * * *